US009323393B2

(12) United States Patent
Djordjev et al.

(10) Patent No.: US 9,323,393 B2
(45) Date of Patent: Apr. 26, 2016

(54) DISPLAY WITH PERIPHERALLY CONFIGURED ULTRASONIC BIOMETRIC SENSOR

(71) Applicant: QUALCOMM Incorporated, San Diego, CA (US)

(72) Inventors: Kostadin Dimitrov Djordjev, San Jose, CA (US); Leonard Eugene Fennell, San Jose, CA (US); Nicholas Ian Buchan, San Jose, CA (US); David William Burns, San Jose, CA (US); Samir K. Gupta, San Diego, CA (US); Sanghoon Bae, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 14/071,362

(22) Filed: Nov. 4, 2013

(65) Prior Publication Data
US 2014/0354596 A1    Dec. 4, 2014

Related U.S. Application Data

(60) Provisional application No. 61/830,582, filed on Jun. 3, 2013.

(51) Int. Cl.
*G06F 3/041* (2006.01)
*G06F 3/042* (2006.01)
*G06K 9/00* (2006.01)

(52) U.S. Cl.
CPC ............ *G06F 3/0421* (2013.01); *G06K 9/0002* (2013.01)

(58) Field of Classification Search
CPC ..... G06F 3/0421; G06F 9/0002; G06F 3/041; G06F 3/0412; G06F 3/043; G06F 3/03547; G06F 3/0416; G06F 3/044; G06F 2203/0338; G06K 9/00013; G06K 9/0002; H01L 27/323

USPC .................................................. 345/168–179
See application file for complete search history.

(56) References Cited

U.S. PATENT DOCUMENTS

| 4,644,406 A | 2/1987 | Nishigaki et al. |
| 5,003,167 A | 3/1991 | Arques |

(Continued)

FOREIGN PATENT DOCUMENTS

| EP | 0593386 A2 | 4/1994 |
| GB | 2150785 A | 7/1985 |

(Continued)

OTHER PUBLICATIONS

Feng T., et al., "Continuous Remote Mobile Identity Management Using Biometric Integrated Touch-Display," 45th Annual IEEE/ACM International Symposium on Microarchitecture Workshops (MICROW), 2012, pp. 55-62.

(Continued)

*Primary Examiner* — Kent Chang
*Assistant Examiner* — Nelson Rosario
(74) *Attorney, Agent, or Firm* — Weaver Austin Villeneuve & Sampson, LLP

(57) ABSTRACT

Various techniques and apparatuses are disclosed that provide for pixelated display modules that integrate an ultrasonic fingerprint or biometric sensing capability. In some implementations, the ultrasonic fingerprint sensor and the display components of the display module may share a common backplane. In some implementations, the ultrasonic fingerprint sensor may share a flex cable with other components in the display module. In some implementations, the ultrasonic fingerprint sensor may leverage conductive traces on a cover glass used to provide for touch input to the display module.

24 Claims, 12 Drawing Sheets

(56) References Cited

U.S. PATENT DOCUMENTS

| | | | |
|---|---|---|---|
| 5,243,332 | A | 9/1993 | Jacobson |
| 7,166,966 | B2 | 1/2007 | Naugler et al. |
| 7,197,168 | B2 | 3/2007 | Russo |
| 7,211,818 | B2 | 5/2007 | Imai et al |
| 7,239,728 | B1 | 7/2007 | Choi et al. |
| 7,330,571 | B2 | 2/2008 | Svensson et al. |
| 7,541,605 | B2 | 6/2009 | Takahashi |
| 7,574,022 | B2 | 8/2009 | Russo |
| 7,785,912 | B2 | 8/2010 | Zhan et al. |
| 8,139,041 | B2 | 3/2012 | Na |
| 8,139,827 | B2 * | 3/2012 | Schneider et al. ............ 382/123 |
| 8,144,115 | B2 | 3/2012 | Konicek |
| 8,201,739 | B2 | 6/2012 | Schneider et al. |
| 8,233,672 | B2 | 7/2012 | Matos |
| 8,416,227 | B2 | 4/2013 | Fujioka et al. |
| 8,508,340 | B2 | 8/2013 | Sanchez et al. |
| 8,661,254 | B1 | 2/2014 | Sama |
| 2002/0174346 | A1 | 11/2002 | Ting |
| 2003/0174870 | A1 | 9/2003 | Kim et al. |
| 2004/0239648 | A1 | 12/2004 | Abdallah et al. |
| 2005/0219222 | A1 | 10/2005 | Johnson et al. |
| 2008/0037372 | A1 | 2/2008 | Schneider et al. |
| 2008/0136587 | A1 | 6/2008 | Orr |
| 2008/0175450 | A1* | 7/2008 | Scott .............................. 382/124 |
| 2008/0253766 | A1 | 10/2008 | Yu et al. |
| 2008/0283751 | A1 | 11/2008 | Kymissis |
| 2009/0006991 | A1 | 1/2009 | Lindberg et al. |
| 2009/0235750 | A1 | 9/2009 | Chang et al. |
| 2010/0053118 | A1 | 3/2010 | Chen |
| 2010/0066686 | A1 | 3/2010 | Joguet et al. |
| 2010/0237992 | A1 | 9/2010 | Liautaud |
| 2011/0215150 | A1 | 9/2011 | Schneider et al. |
| 2011/0279662 | A1 | 11/2011 | Schneider et al. |
| 2011/0298711 | A1 | 12/2011 | Dean et al. |
| 2012/0014569 | A1 | 1/2012 | Frye et al. |
| 2012/0144306 | A1 | 6/2012 | Moody et al. |
| 2012/0147698 | A1* | 6/2012 | Wong et al. ......................... 367/7 |
| 2012/0191568 | A1 | 7/2012 | Gandhi |
| 2012/0311165 | A1 | 12/2012 | Renschler et al. |
| 2013/0036017 | A1 | 2/2013 | Galloway |
| 2013/0049771 | A1* | 2/2013 | Peng et al. ..................... 324/658 |
| 2013/0120284 | A1 | 5/2013 | Chen et al. |
| 2013/0127592 | A1 | 5/2013 | Fyke et al. |
| 2013/0132906 | A1 | 5/2013 | Siurumaa et al. |
| 2013/0135247 | A1 | 5/2013 | Na et al. |
| 2013/0136321 | A1 | 5/2013 | Lee et al. |
| 2013/0160109 | A1 | 6/2013 | Klinghult |
| 2013/0201134 | A1* | 8/2013 | Schneider et al. ............ 345/173 |
| 2013/0272586 | A1 | 10/2013 | Russo |
| 2013/0279768 | A1 | 10/2013 | Boshra et al. |
| 2013/0279769 | A1* | 10/2013 | Benkley et al. ............... 382/124 |
| 2013/0335371 | A1 | 12/2013 | Bayramoglu et al. |
| 2014/0003678 | A1 | 1/2014 | Vieta et al. |
| 2014/0198960 | A1 | 7/2014 | Thompson et al. |
| 2014/0333328 | A1* | 11/2014 | Nelson et al. .................. 324/663 |
| 2014/0359757 | A1 | 12/2014 | Sezan et al. |
| 2015/0070320 | A1 | 3/2015 | Hong et al. |
| 2015/0070323 | A1 | 3/2015 | Hong et al. |
| 2015/0071648 | A1 | 3/2015 | Hong et al. |
| 2015/0084873 | A1 | 3/2015 | Hagenbuch et al. |
| 2015/0123931 | A1 | 5/2015 | Kitchens et al. |

FOREIGN PATENT DOCUMENTS

| | | | |
|---|---|---|---|
| JP | 56002075 | | 1/1981 |
| JP | 59041957 | | 3/1984 |
| KR | 20130066152 | A | 6/2013 |
| TW | M452385 | U1 | 5/2013 |
| WO | 9928701 | | 6/1999 |
| WO | 2005043451 | | 5/2005 |
| WO | 2006042144 | A2 | 4/2006 |
| WO | 2007146785 | A2 | 12/2007 |
| WO | 2009032522 | A1 | 3/2009 |
| WO | 2009139760 | A1 | 11/2009 |
| WO | 2014197333 | A1 | 12/2014 |
| WO | 2015038396 | | 3/2015 |
| WO | PCT/US15/19498 | | 3/2015 |
| WO | PCT/US15/19499 | | 3/2015 |
| WO | 2015066330 | A1 | 5/2015 |
| WO | 2015066599 | A2 | 5/2015 |
| WO | 2015153067 | A1 | 10/2015 |
| WO | 2015153068 | A1 | 10/2015 |

OTHER PUBLICATIONS

International Search Report and Written Opinion—PCT/US2014/054057—ISA/EPO—Nov. 10, 2014.
International Search Report and Written Opinion—PCT/US2014/040380—ISA/EPO—Nov. 6, 2014.
Invitation to Pay Additional Fees and, Where Applicable, Protest Fee—PCT/US2014/063663—ISA/EPO—Jan. 27, 2015.
International Search Report and Written Opinion—PCT/US2014/063158—ISA/EPO—Feb. 2, 2015.
U.S. Restriction Requirement dated May 28, 2015, issued in U.S. Appl. No. 14/088,021.
U.S. Office Action dated Aug. 13, 2015, issued in U.S. Appl. No. 14/071,320.
U.S. Office Action dated May 18, 2015, issued in U.S. Appl. No. 14/178,156.
U.S. Final Office Action dated Sep. 2, 2015, issued in U.S. Appl. No. 14/178,156.
Second Written Opinion of the International Preliminary Examining Authority dated May 7, 2015, issued in PCT/US2014/040380.
International Search Report and Written Opinion—PCT/US2014/063663—ISA/EPO—May 27, 2015.
International Search Report and Written Opinion—PCT/US2015/019498—ISA/EPO—Jun. 10, 2015.
Invitation to Pay Additional Fees and, Where Applicable, Protest Fee—PCT/US2015/019499—ISA/EPO—Jun. 8, 2015.
International Search Report and Written Opinion—PCT/US2015/019499—ISA/EPO—Aug. 31, 2015.
U.S. Notice of Allowance dated Dec. 3, 2015, issued in U.S. Appl. No. 14/071,320.
International Preliminary Report on Patentability—PCT/US2014/040380—ISA/EPO—Sep. 11, 2015.
Second Written Opinion of the International Preliminary Examining Authority dated Oct. 5, 2010, issued in PCT/US2014/063663.
International Preliminary Report on Patentability—PCT/US2014/063663—ISA/EPO—Jan. 11, 2016.
Second Written Opinion of the International Preliminary Examining Authority dated Sep. 30, 2015, issued in PCT/US2014/063158.
Sattler, Klaus D. (2014) "Fundamentals of Picoscience," *CRC Press*, Taylor & Francis Group, New York, pp. 541-592.
Ihara, Ikuo (2008) "Ultrasonic Sensing: Fundamentals and Its Applications to Nondestructive Evaluation (a draft)," *Nagaoka University of Technology*, pp. 1-20.
U.S. Notice of Allowance dated Jan. 21, 2016, issued in U.S. Appl. No. 14/071,320.
U.S. Office Action dated Feb. 12, 2016, issued in U.S. Appl. No. 14/178,156.
U.S. Office Action dated Feb. 2, 2016, issued in U.S. Appl. No. 14/243,550.

* cited by examiner

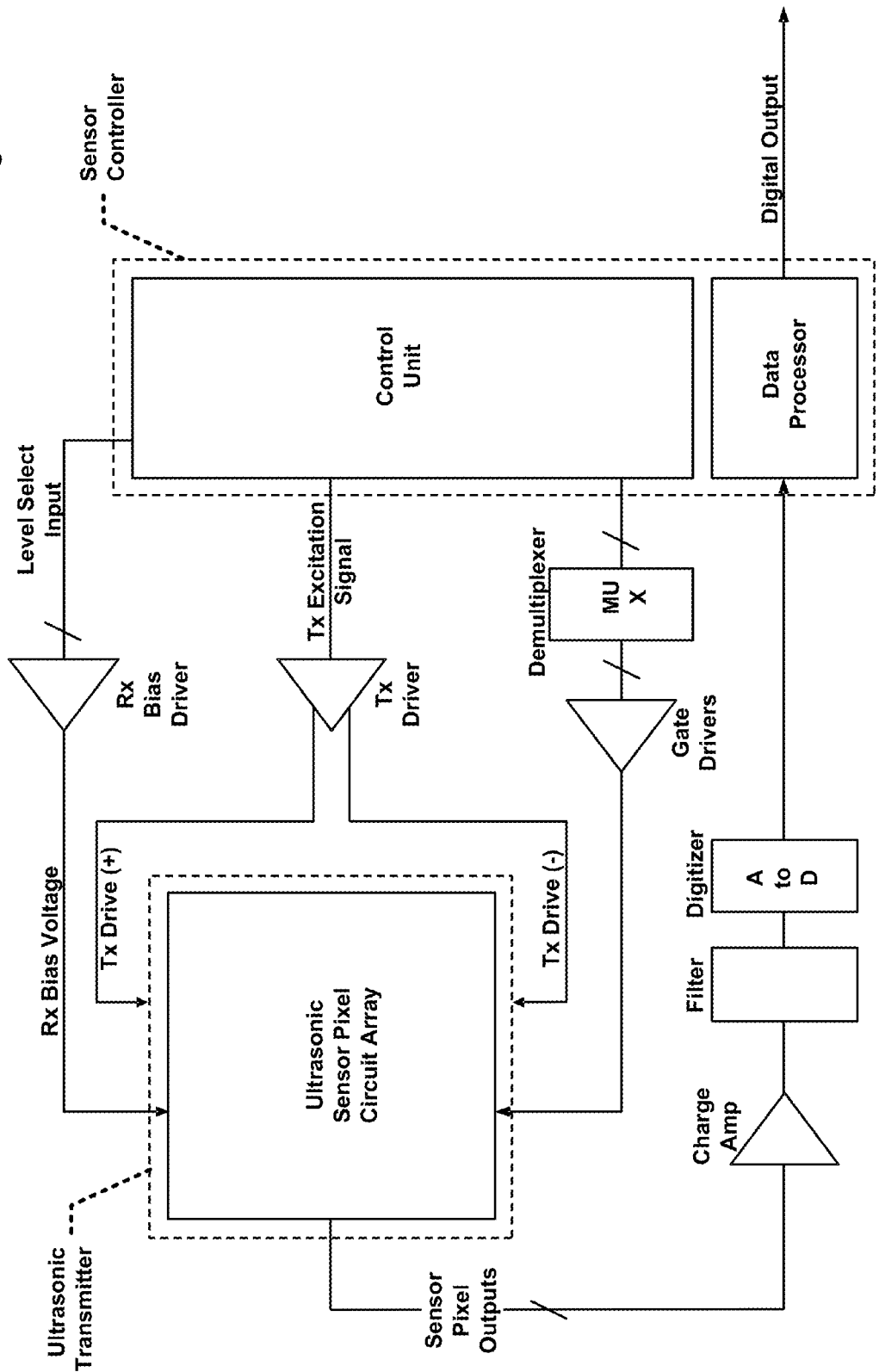

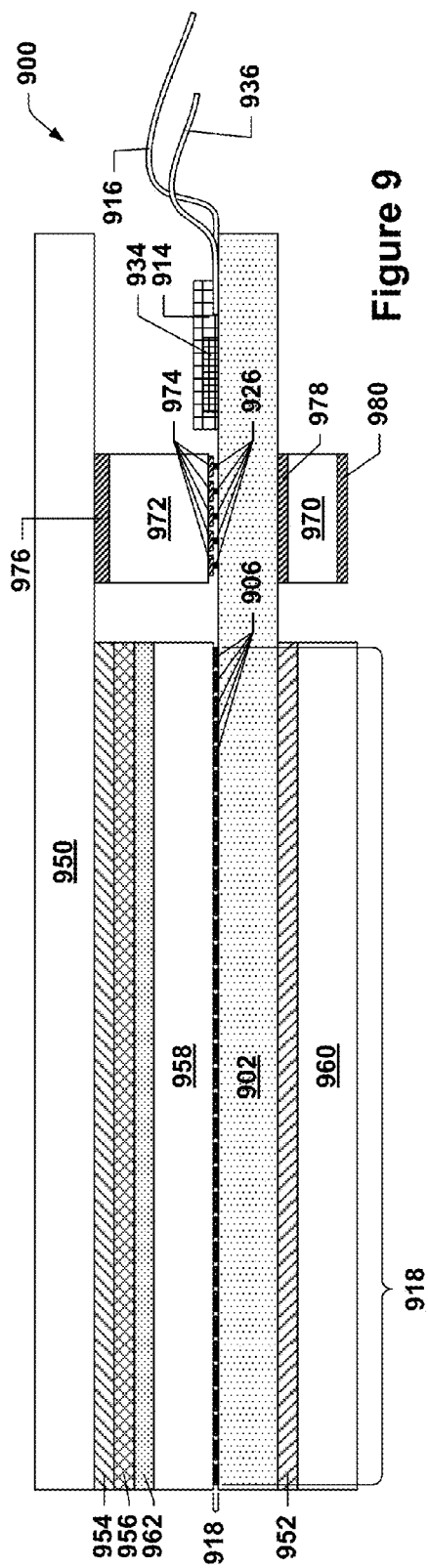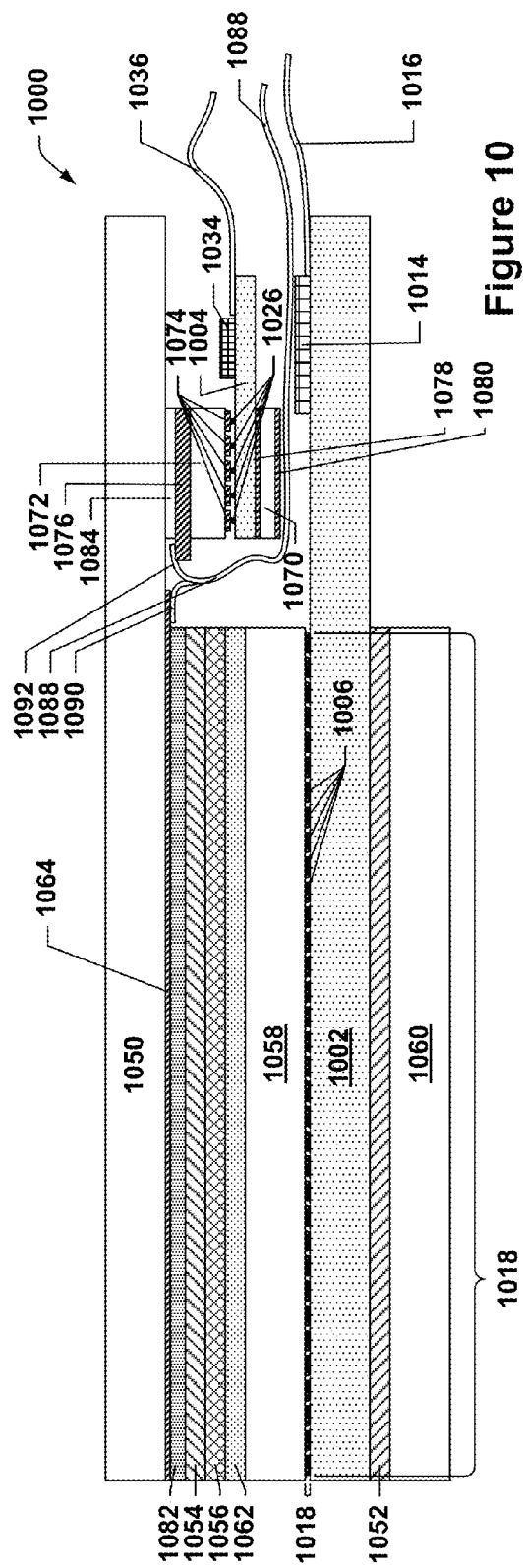

DISPLAY WITH PERIPHERALLY CONFIGURED ULTRASONIC BIOMETRIC SENSOR

CROSS REFERENCE TO RELATED APPLICATION

This application claims benefit of priority under 35 U.S.C. §119(e) to U.S. Provisional Patent Application No. 61/830,582, filed Jun. 3, 2013, which is hereby incorporated by reference herein in its entirety and for all purposes.

TECHNICAL FIELD

This disclosure relates generally to pixelated digital display modules. More specifically, this disclosure relates to display modules having ultrasonic fingerprint and biometric sensors integrated therein.

DESCRIPTION OF THE RELATED TECHNOLOGY

In an ultrasonic sensor system, an ultrasonic transmitter may be used to send an ultrasonic wave through an ultrasonically transmissive medium or media and towards an object to be detected. The transmitter may be operatively coupled with an ultrasonic sensor configured to detect portions of the ultrasonic wave that are reflected from the object. For example, in ultrasonic fingerprint imagers, an ultrasonic pulse may be produced by starting and stopping the transmitter during a very short interval of time. At each material interface encountered by the ultrasonic pulse, a portion of the ultrasonic pulse is reflected.

For example, in the context of an ultrasonic fingerprint imager, the ultrasonic wave may travel through a platen on which a person's finger may be placed to obtain a fingerprint image. After passing through the platen, some portions of the ultrasonic wave encounter skin that is in contact with the platen, e.g., fingerprint ridges, while other portions of the ultrasonic wave encounter air, e.g., valleys between adjacent ridges of a fingerprint, and may be reflected with different intensities back towards the ultrasonic sensor. The reflected signals associated with the finger may be processed and converted to a digital value representing the signal strength of the reflected signal. When multiple such reflected signals are collected over a distributed area, the digital values of such signals may be used to produce a graphical display of the signal strength over the distributed area, for example by converting the digital values to an image, thereby producing an image of the fingerprint. Thus, an ultrasonic sensor system may be used as a fingerprint sensor or other type of biometric sensor. In some implementations, the detected signal strength may be mapped into a contour map of the finger that is representative of the depth of the ridge structure detail.

SUMMARY

The systems, methods and devices of the disclosure each have several innovative aspects, no single one of which is solely responsible for the desirable attributes disclosed herein.

In some implementations, a thin-film transistor (TFT) backplane may be provided. The TFT backplane may include a substrate with a first side and an opposing second side. An array of display pixel circuits may be located on or in the first side, each display pixel circuit configured to cause a display pixel of a display device connectable to the TFT backplane to change light-emitting, light-transmitting, or light-reflecting states. An array of sensor pixel circuits may be located on or in the first side, each sensor pixel circuit configured to form part of a sensor circuit configured to read a charge provided to the sensor circuit from an array location. The array of display pixel circuits and the array of sensor pixel circuits may occupy non-overlapping areas of the TFT backplane.

In some implementations of the TFT backplane, the array of sensor pixel circuits may be configured to form part of a piezoelectric sensor circuit for a piezoelectric ultrasonic biometric sensor. In some such implementations, the piezoelectric ultrasonic biometric sensor may be a fingerprint sensor. In some additional such implementations, the fingerprint sensor may be large enough to capture fingerprints from at least two fingers simultaneously. In some implementations, the piezoelectric ultrasonic biometric sensor may be a palmprint sensor.

In some implementations of the TFT backplane, the TFT backplane may also include a single sensor pixel circuit separate from the array of sensor pixel circuits, the single pixel circuit configured to perform as an ultrasonic button.

In some implementations of the TFT backplane, the TFT backplane may also include an array of pixel input electrodes. In such implementations, each pixel input electrode may overlay a sensor pixel circuit in the array of sensor pixel circuits. The sensor pixel circuits may be spaced apart at a first pitch distance in a first direction, and each pixel input electrode may have a nominal width in the first direction greater than about 70% of the first pitch distance and less than the first pitch distance.

In some implementations of the TFT backplane, the TFT backplane may also include a piezoelectric layer that overlays the array of sensor pixel circuits.

In some implementations of the TFT backplane, the sensor pixel circuits may be arrayed with a density of approximately 500 sensor pixel circuits per inch or higher.

In some implementations of the TFT backplane, the TFT backplane may also include a plurality of display data traces that are substantially parallel to one another and spaced apart by a first pitch distance within the area of the TFT backplane occupied by the array of display pixel circuits. In such implementations, the TFT backplane may also include a display fanout. The display data traces may enter the display fanout spaced apart by the first pitch distance and may exit the display fanout spaced apart by a second pitch distance less than the first pitch distance. The display fanout may be located substantially between the array of sensor pixel circuits and the array of array of display pixel circuits.

In some such implementations of the TFT backplane, the TFT backplane may also include a plurality of sensor data traces that are substantially parallel to one another and spaced apart by a third pitch distance within the area of the TFT backplane occupied by the array of sensor pixel circuits. In such TFT backplane implementations, the TFT backplane may also include a sensor fanout. The sensor data traces may enter the sensor fanout spaced apart by the third pitch distance and exit the sensor fanout spaced apart by a fourth pitch distance less than the third pitch distance.

In some additional such implementations of the TFT backplane, the TFT backplane may also include a display driver chip and a sensor driver chip that are both located on the TFT backplane. The display driver chip may be electrically connected to the display data traces exiting the display fanout and having the second pitch distance and the sensor driver chip may be electrically connected to the sensor data traces exiting the sensor fanout and having the fourth pitch distance. The sensor driver chip and the display driver chip may be separate chips.

In some additional implementations of the TFT backplane, the TFT backplane may also include a combined display and sensor driver chip located on the TFT backplane. The combined display and sensor driver chip may be electrically connected to the display data traces exiting the display fanout and having the second pitch distance as well with the sensor data traces exiting the sensor fanout and having the fourth pitch distance. The combined display and sensor driver chip may be a single integrated chip.

In some implementations, a display module may be provided. The display module may have a cover glass sized larger than an active display area of the display module. The display module may also include a thin-film transistor (TFT) backplane with a first side and an opposing second side. The TFT backplane may have an array of display pixel circuits located on or in the first side and an array of sensor pixel circuits located on or in the first side, each sensor pixel circuit configured to form part of a piezoelectric sensor circuit for a piezoelectric sensor. The array of display pixel circuits and the array of sensor pixel circuits may occupy non-overlapping areas of the TFT backplane. The display module may also include one or more display components stacked between the cover glass and the TFT backplane and configured to, in conjunction with the array of display pixel circuits, provide display functionality for the display module. The display module may also include an ultrasonic sensor system. At least part of the ultrasonic sensor system may be located between the TFT backplane and the cover glass, and the array of sensor pixel circuits may form part of the ultrasonic sensor system.

In some such display module implementations, the ultrasonic sensor system may include an ultrasonic transmitter and an ultrasonic receiver in a stacked arrangement, and the distance between the ultrasonic transmitter and the cover glass and the distance between the ultrasonic receiver and the cover glass may both be substantially free of gaps.

In some such display module implementations, the ultrasonic transmitter may include a piezoelectric ultrasonic transmitter layer interposed between a first transmitter electrode and a second transmitter electrode, and the ultrasonic receiver may include a piezoelectric ultrasonic receiver layer interposed between the array of sensor pixel circuits and a receiver bias electrode. In some additional such implementations of the display module, the ultrasonic receiver may be interposed between the TFT backplane and the cover glass.

In some implementations, the display module may include a conductive touch layer formed on the cover glass and the receiver bias electrode may be provided by a portion of the conductive touch layer. In some additional such implementations, the conductive touch layer around the array of sensor pixel circuits may be electrically-reinforced with silver ink and the conductive touch layer within the array of sensor pixel circuits may be substantially free of silver ink. As used herein, the electrically-reinforced portion of the conductive touch layer may have a substantially higher electrical conductivity than the average or nominal electrical conductivity of the remainder of the conductive touch layer.

In some implementations of the display module, the display module may include one or more spacers arranged in a stacked configuration with the ultrasonic receiver. The one or more display components stacked between the cover glass and the TFT backplane may have a display stack thickness. The ultrasonic receiver, inclusive of the receiver bias electrode, may have an ultrasonic receiver thickness that is less than the display stack thickness, and the stacked configuration of the one or more spacers and the ultrasonic receiver, inclusive of the receiver bias electrode and any adhesive or bonding layers between the ultrasonic receiver and the one or more spacers, may have a first stack thickness that is substantially equal to the display stack thickness.

In some implementations, a thin-film transistor (TFT) backplane may be provided. The TFT backplane may include a substrate with a first side and an opposing second side, an array of display pixel circuits located on or in the first side, each display pixel circuit configured to cause a display pixel of a display device connectable with the TFT backplane to change light-emitting, light-transmitting, or light-reflecting states, and a sensor pixel circuit located on or in the first side, the sensor pixel circuit configured to form part of a sensor circuit configured to read a charge provided to the sensor circuit. The array of display pixel circuits and the sensor pixel circuit may occupy non-overlapping areas of the TFT backplane.

In some such implementations, the TFT backplane may include one or more additional sensor pixel circuits. In some further such implementations, the sensor pixel circuit and the one or more additional sensor pixel circuits may be configured to provide a slider control.

In some implementations of the TFT backplane, the sensor pixel circuit may be configured to be a button control.

In some implementations of the TFT backplane, the TFT backplane may also include an array of second sensor pixel circuits located on or in the first side, each second sensor pixel circuit configured to form part of a second sensor circuit configured to read a charge provided to the second sensor circuit from an array location. The array of display pixel circuits and the array of second sensor pixel circuits may occupy non-overlapping areas of the TFT backplane.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

Like reference numbers and designations in the various drawings indicate like elements.

FIG. 3B shows an example of a high-level block diagram of an ultrasonic sensor system.

FIG. 9 depicts a conceptual side view of an example of a display module with an integrated ultrasonic biometric sensor.

FIG. 10 depicts a conceptual side view of another example of a display module with an integrated ultrasonic biometric sensor.

DETAILED DESCRIPTION

Figure 1A:
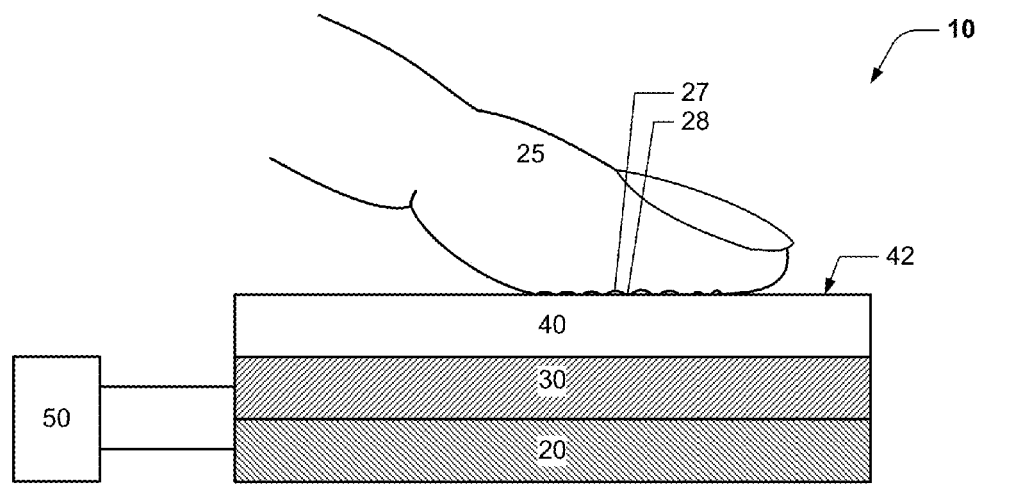
FIGS. 1A-1C show an example of a schematic diagram of an ultrasonic sensor system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system for ultrasonic sensing. In addition, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The implementations described herein relate to pixelated display modules that incorporate an ultrasonic biometric sensor such as a fingerprint sensor at a location peripheral to the display area of the display module. The various concepts outlined herein are primarily discussed with respect to integration with a liquid crystal display, but may be implemented in display modules using other types of display technology, including OLED, LED, e-ink, microelectromechanical systems (MEMS)-based reflective displays, and so forth. For example, any display having a cover glass may serve as a potential candidate for integration with an ultrasonic biometric sensor that is mounted to the cover glass, as discussed in more detail later in this disclosure. Additionally, any display having a display pixel circuit-providing backplane may serve as a potential candidate for integration with an ultrasonic biometric sensor such that the backplane contains two arrays of pixel circuits—an array of display pixel circuits that are configured to deliver voltage or current to display pixels and a separate array of sensor pixel circuits that are configured to detect a charge generated in a piezoelectric receiver layer. Such concepts are also discussed in more detail later in this disclosure.

The various concepts outlined herein may be generally advantageous in a number of ways. For example, one significant advantage that is provided by many of the implementations described herein is that a cell-phone-sized display module with an ultrasonic fingerprint sensor integrated near the periphery of the display area may be provided. Such an ultrasonic fingerprint sensor may allow for through-cover-glass fingerprint imaging, even through portions of the cover glass that are opaque to light, e.g., such as portions of the cover glass that are screen printed or otherwise rendered opaque so as to obscure internal circuitry, or other device features deemed non-aesthetic by many, from external view. This may allow for a biometric access control for portable electronic devices utilizing such a display module, which represents an added level of protection for the device owner without sacrificing the overall design aesthetic of the portable device.

Another advantage, as described further below, is that sensor pixel circuits for an ultrasonic fingerprint sensor may be implemented on existing display pixel circuit backplanes with little or no change to the existing display pixel circuit (or to the manufacturing process used to produce such display pixel circuits). In some implementations, a design for an array of sensor pixel circuits may simply be copied onto a backplane design with minimal additional effort. In some cases, circuit component designs, e.g., multiplexers, drivers, etc., that are already proven and used in display pixel circuits on an existing backplane may also be used to provide circuit functionality in a sensor pixel circuit or attendant sensor circuitry. A further benefit is that design rules formulated to govern the construction of display-related circuitry on the backplane may be equally applicable to ultrasonic fingerprint sensor-related circuitry provided on the same backplane. Thus, implementing a backplane that provides both an array of display pixel circuits and an array of sensor pixel circuits may be achievable with considerably reduced effort than might otherwise expended in order to provide fingerprint sensing capability to display modules using other avenues.

The full implications of such benefits are not readily apparent, and are worthy of at least some comment. Producing a new TFT backplane design from scratch may involve a considerable expenditure of resources by a backplane manufacturer. As a result, such manufacturers, in a practical sense, are often loathe to embark on such ventures unless a customer is willing to commit to purchasing hundreds of thousands or millions of backplanes. In turn, potential customers are often not able to commit to such expenditures, and there are thus significant barriers to implementing new backplane designs. However, if a backplane manufacturer can leverage an existing, proven display backplane and readily integrate ultrasonic fingerprint scanning capability or support into the backplane, the manufacturer is much more likely to be open to pursuing such a design.

Another advantage to integrating an ultrasonic fingerprint sensor into an existing display module is that such fingerprint sensors, due to being located in a location in the display module that is outside of the display area, i.e., peripherally to the display area, may allow for various commonly-used touch interface technologies to be used in conjunction with the display portion of the display module with little or no change in performance. For example, an ultrasonic fingerprint sensor located in a display module in an area outside of the display area would not interfere with a resistive or capacitive touch sensor layer overlaid on the display area. Thus, the ultrasonic fingerprint sensor placement and integration concepts with respect to display modules outlined herein may be used with a wide variety of different touch-sensing technologies.

Generally speaking, there are two design paradigms that are often followed in the design of modern electrical components. In the first, components are compartmentalized and easily interchanged—they may be standardized in terms of their connections, power requirements, input and outputs, etc., allowing them to be easily integrated into an assembly. Such compartmentalization allows the device designer, e.g., a mobile device designer, a high degree of flexibility in terms of selecting components that may be used in a device.

A contrasting approach is to integrate the functionality normally provided by separate components into a single device. This approach is most often used when a common set of circuits may be used to provide the functionality normally provided by two separate components, or when two components have complementary functionality. For example, a touch-screen sensor may be provided as an integral part of a display panel, e.g., provided by a capacitive touch layer on the display cover glass. Such an integrated solution is logical in this case since the touch-screen sensor complements the display panel and is co-located with the display panel.

The peripherally-located-with-respect-to-the-display sensor concepts discussed herein represent a notable departure from both of these design paradigms. By integrating a fingerprint or other type of sensor pixel circuit into a common backplane in an area that is peripheral to an array of display pixel circuits on the backplane, two otherwise separate systems are integrated into a common component, thus negating the ability to easily switch between using different sensors, e.g., fingerprint scanners, with different display modules—this runs counter to the compartmentalization design paradigm. At the same time, two systems that do not share functionality or have complementary functionality, i.e., a display module and a sensor located peripherally to the display module, are integrated into a common component. This is contrary to the integrated functionality design paradigm since there is no functional reason for combining the two systems based on their use in an end-user device. Thus, the concepts outlined herein represent a counter-intuitive approach to the integration of sensor pixel circuits in a common backplane with display pixel circuits.

Figure 1B:
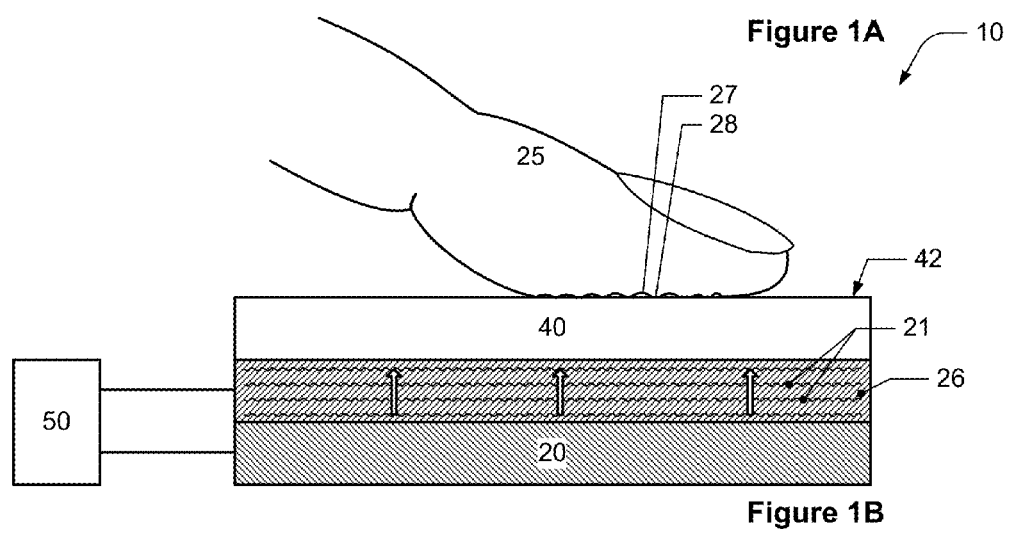
Figure 1C:
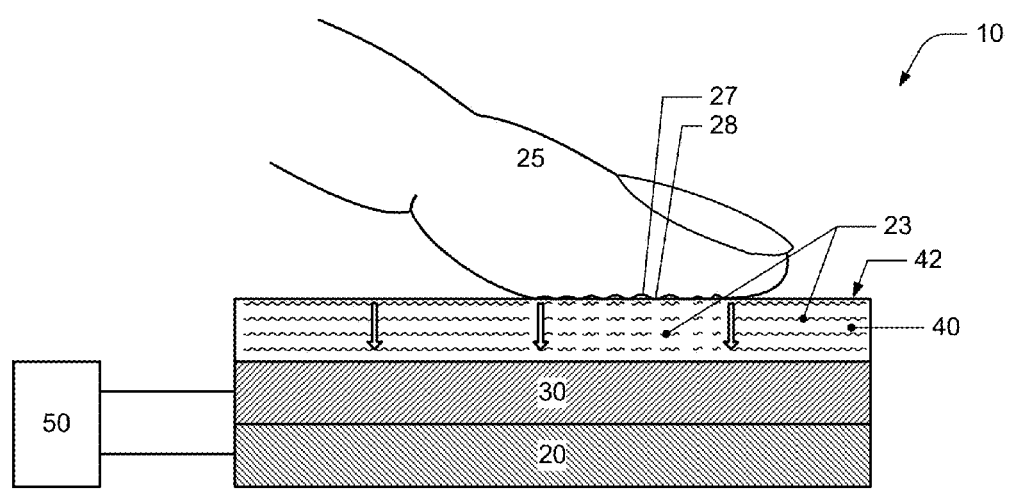

FIGS. 1A-1C show an example of a schematic diagram of an ultrasonic sensor system. As shown in FIG. 1A, ultrasonic sensor system 10 may include an ultrasonic transmitter 20 and an ultrasonic receiver 30 under a platen 40. The ultrasonic transmitter 20 may be a piezoelectric transmitter that can generate ultrasonic waves 21 (see FIG. 1B). The ultrasonic receiver 30 includes a piezoelectric material and an array of pixel circuits disposed on a substrate. In operation, the ultrasonic transmitter 20 generates an ultrasonic wave 21 that travels through the ultrasonic receiver 30 to the exposed surface 42 of the platen 40. At the exposed surface 42 of the platen 40, the ultrasonic energy may either be absorbed or scattered by an object 25 that is in contact with the platen 40, such as the skin of a fingerprint ridge 28, or reflected back. In those locations where air contacts the exposed surface 42 of the platen 40, e.g., valleys 27 between fingerprint ridges 28, most of the ultrasonic wave 21 will be reflected back toward the ultrasonic receiver 30 for detection (see FIG. 1C). Control electronics 50 may be coupled to the ultrasonic transmitter 20 and ultrasonic receiver 30 and may supply timing signals that cause the ultrasonic transmitter 20 to generate one or more ultrasonic waves 21. The control electronics 50 may then receive signals from the ultrasonic receiver 30 that are indicative of reflected ultrasonic energy 23. The control electronics 50 may use output signals received from the ultrasonic receiver 30 to construct a digital image of the object 25. In some implementations, the control electronics 50 may also, over time, successively sample the output signals to detect movement of the object 25.

Figure 2:
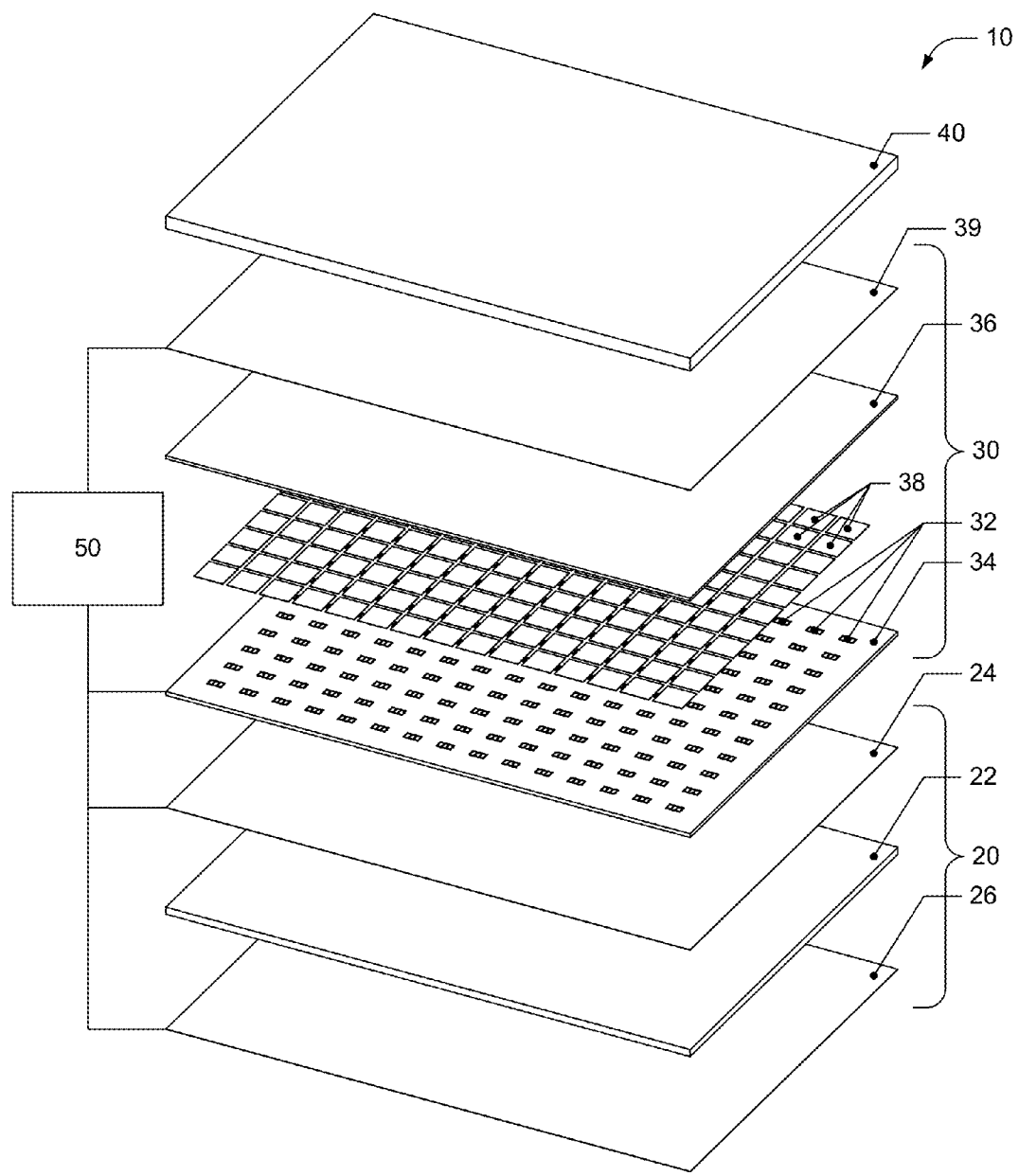
FIG. 2 shows an example of an exploded view of an ultrasonic sensor system.

FIG. 2 shows an example of an exploded view of an ultrasonic sensor system 10 including an ultrasonic transmitter 20 and an ultrasonic receiver 30 under a platen 40. The ultrasonic transmitter 20 may be a plane wave generator including a substantially planar piezoelectric transmitter layer 22. Ultrasonic waves may be generated by applying a voltage to the piezoelectric layer to expand or contract the layer, depending upon the signal applied, thereby generating a plane wave. The voltage may be applied to the piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave travels toward a finger (or other object to be detected), passing through the platen 40. A portion of the wave not absorbed by the object to be detected may be reflected so as to pass back through the platen 40 and be received by the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of pixel circuits 32 disposed on a substrate 34, which also may be referred to as a backplane, and a piezoelectric receiver layer 36. In some implementations, each pixel circuit 32 may include one or more TFT elements, electrical interconnect traces and, in some implementations, one or more additional circuit elements such as diodes, capacitors, and the like. Each pixel circuit 32 may be configured to convert an electric charge generated in the piezoelectric receiver layer 36 proximate to the pixel circuit into an electrical signal. Each pixel circuit 32 may include a pixel input electrode 38 that electrically couples the piezoelectric receiver layer 36 to the pixel circuit 32.

Figure 3A:
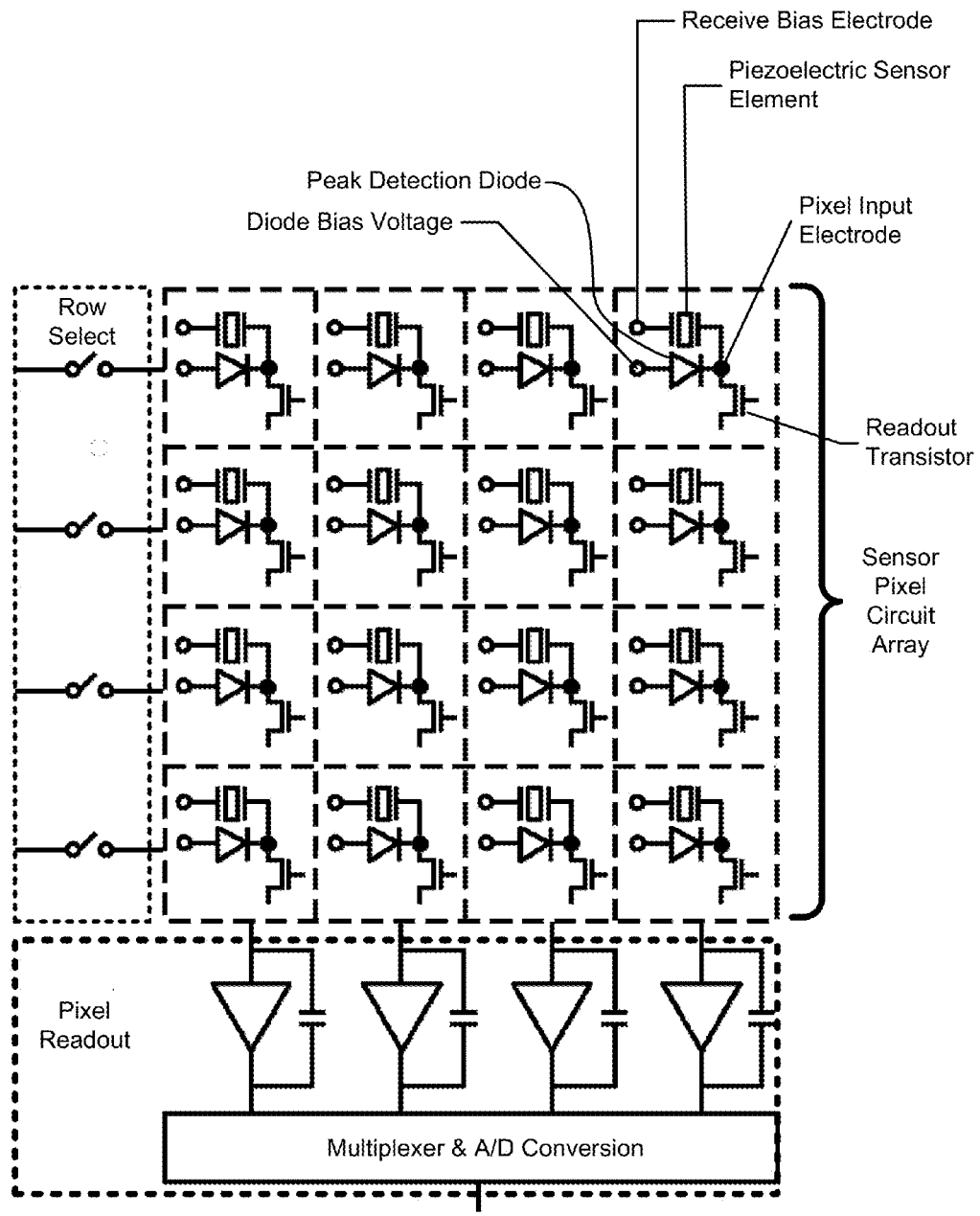
FIG. 3A shows an example of a 4×4 pixel array of pixels for an ultrasonic sensor.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals are passed to the TFT array. Ultrasonic energy that is reflected from the exposed (top) surface 42 of the platen 40 is converted into localized electrical charges by the piezoelectric receiver layer 36. These localized charges are collected by the pixel input electrodes 38 and are passed on to the underlying pixel circuits 32. The charges may be amplified by the pixel circuits 32 and provided to the control electronics, which processes the output signals. A simplified schematic of an example pixel circuit 32 is shown in FIG. 3A, however one of ordinary skill in the art will appreciate that many variations of and modifications to the example pixel circuit 32 shown in the simplified schematic may be contemplated.

Control electronics 50 may be electrically connected to the first transmitter electrode 24 and the second transmitter electrode 26, as well as with the receiver bias electrode 39 and the pixel circuits 32 on the substrate 34. The control electronics 50 may operate substantially as discussed previously with respect to FIGS. 1A-1C.

The platen 40 can be any appropriate material that can be acoustically coupled to the receiver, with examples including plastic, ceramic, glass, and sapphire. In some implementations, the platen 40 can be a cover plate, e.g., a cover glass or a lens glass for a display. Detection and imaging can be performed through relatively thick platens if desired, e.g., 3 mm and above.

Examples of piezoelectric materials that may be employed according to various implementations include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF piezoelectric transmitter layer 22 is approximately 28 µm thick and a PVDF-TrFE receiver layer 36 is approximately 12 µm thick. Example frequencies of the ultrasonic waves are in the range of 5 MHz to 30 MHz, with wavelengths on the order of a quarter of a millimeter or less.

FIGS. 1A through 1C and 2 show example arrangements of ultrasonic transmitters and receivers in an ultrasonic sensor system, with other arrangements possible. For example, in some implementations, the ultrasonic transmitter 20 may be above the ultrasonic receiver 30, i.e., closer to the object of detection. In some implementations, the ultrasonic sensor system may include an acoustic delay layer. For example, an acoustic delay layer can be incorporated into the ultrasonic sensor system 10 between the ultrasonic transmitter 20 and the ultrasonic receiver 30. An acoustic delay layer can be employed to adjust the ultrasonic pulse timing, and at the same time electrically insulate the ultrasonic receiver 30 from the ultrasonic transmitter 20. The delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system 10 is arriving at the ultrasonic receiver 30. In some implementations, the TFT substrate 34 and/or the platen 40 may serve as an acoustic delay layer.

FIG. 3A depicts a 4×4 pixel array of pixels for an ultrasonic sensor. Each pixel may, for example, be associated with a local region of piezoelectric sensor material, a peak detection diode and a readout transistor; many or all of these elements may be formed on or in the backplane to form the pixel circuit. In practice, the local region of piezoelectric sensor material of each pixel may transduce received ultrasonic energy into electrical charges. The peak detection diode may register the maximum amount of charge detected by the local region of piezoelectric sensor material. Each row of the pixel array may then be scanned, e.g., through a row select mechanism, a gate driver, or a shift register, and the readout transistor for each column may be triggered to allow the magnitude of the peak charge for each pixel to be read by additional circuitry, e.g., a multiplexer and an A/D converter. The pixel circuit may include one or more TFTs to allow gating, addressing, and resetting of the pixel.

Each pixel circuit 32 may provide information about a small portion of the object detected by the ultrasonic sensor system 10. While, for convenience of illustration, the example shown in FIG. 3A is of a relatively coarse resolution, ultrasonic sensor systems having a resolution on the order of 500 pixels per inch or higher that are configured with a layered structure substantially similar to that shown in FIG. 2 have been demonstrated by the present inventors. The detection area of the ultrasonic sensor system 10 may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the object.

FIG. 3B shows an example of a high-level block diagram of an ultrasonic sensor system. Many of the elements shown may form part of control electronics 50. A sensor controller may include a control unit that is configured to control various aspects of the sensor system, e.g., ultrasonic transmitter timing and excitation waveforms, bias voltages for the ultrasonic receiver and pixel circuitry, pixel addressing, signal filtering and conversion, readout frame rates, and so forth. The sensor controller may also include a data processor that receives data from the ultrasonic sensor circuit pixel array. The data processor may translate the digitized data into image data of a fingerprint or format the data for further processing.

For example, the control unit may send a transmitter (Tx) excitation signal to a Tx driver at regular intervals to cause the Tx driver to excite the ultrasonic transmitter and produce planar ultrasonic waves. The control unit may send level select input signals through a receiver (Rx) bias driver to bias the receiver bias electrode and allow gating of acoustic signal detection by the pixel circuitry. A demultiplexer may be used to turn on and off gate drivers that cause a particular row or column of sensor pixel circuits to provide sensor output signals. Output signals from the pixels may be sent through a charge amplifier, a filter such as an RC filter or an anti-aliasing filter, and a digitizer to the data processor. Note that portions of the system may be included on the TFT backplane and other portions may be included in an associated integrated circuit.

Having described in some detail an example ultrasonic fingerprint sensor, the following discussion addresses characteristics of typical display modules. There are many different technologies that may be used to provide modern, pixelated display devices for use in computer monitors, televisions, mobile devices, and other electronic equipment. Liquid crystal displays (LCDs) and organic light-emitting diode (OLED) displays are examples of two such technologies. As mentioned previously, many of the examples in this disclosure focus on integration of an ultrasonic fingerprint sensor with an LCD-type display architecture, although the general techniques, design rules, and concepts outlined herein may also be applied to other types of display technology as well.

In LCDs, light emitted from a uniformly-illuminated backlight passes through two polarizers that are parallel to one another but oriented with their polarization axes perpendicular to one another. An array of liquid crystal cells, or pixels, is interposed between the two polarizers. Each liquid crystal cell is typically configured such that the liquid crystal inside "relaxes" into a "twisted nematic state" when no voltage is applied to the liquid crystal cell. In the twisted nematic state, the liquid crystal causes polarized light passing through the polarizer interposed between the liquid crystal cell and the backlight to be twisted by 90°, allowing the light to then pass through the remaining polarizer.

When a voltage is applied across a liquid crystal cell, the liquid crystal untwists, causing the initially polarized light passing through the liquid crystal to be twisted to a lesser degree, resulting in less transmission of the light through the second polarizer. The amount of twisting/untwisting of the light is dependent on the voltage applied, allowing the amount of light that passes through the dual-polarizer stack to be modulated. Each such liquid crystal cell may serve as a pixel or a subpixel of a display device. If color output is desired, a color filter array may be placed between the liquid crystal layer and the viewing surface of the display. The color filter array may filter the light that is produced by each pixel such that it is substantially monochromatic, e.g., red, green, or blue. By combining the output of multiple pixels, e.g., a red pixel, a green pixel, and a blue pixel, it may be possible to tune the blended color produced by each such pixel grouping. In such cases, the pixel elements may be referred to as subpixels, and each grouping of subpixels that may be tuned to produce blended light of a particular color may be referred to as a pixel.

OLED displays utilize a more direct technique for providing light. In OLED displays, each pixel, or subpixel, is a single light-emitting diode. Each diode may be individually controlled so as to produce a varying amount of light of a particular color. This bypasses the need for polarizer films and liquid crystal elements and reduces the amount of light that is "wasted" by a display panel as compared with an LCD display panel.

While LCDs and OLED displays use very different techniques for producing light, each type of display requires a mechanism for individually controlling each display pixel or subpixel. To provide such control, these displays utilize an array of thin-film transistors (TFTs). The TFTs for LCDs are commonly fabricated on a clear TFT backplane (also simply referred to herein as a "backplane"), e.g., a glass or transparent polymer, to facilitate light transmission from the backlight through the backplane and into the liquid crystal cells. The TFTs for OLED displays may also be manufactured on a clear backplane, although opaque backplanes may be used in such types of displays.

Each display pixel of a display module may include one or more TFTs that are arranged, sometimes in combination with other circuit elements, in a circuit that controls the behavior of that display pixel; such pixel-level circuits are referred to herein as display pixel circuits. The display pixel circuits are arranged on the backplane in an array that is substantially coextensive with the display pixel array. Rather than address all of the display pixel circuits controlling the pixels in the display simultaneously, which would require separate traces for each and every display pixel circuit, the control electronics for such display modules typically sequentially "scan" through each row or column of the display pixel circuits at a very high frequency. To facilitate such control, each column may, for example, have a separate "data" line or trace, and each row may have a separate "scan" line or trace. Alternatively, each row may have a separate data line or trace, and each column may have a separate scan line or trace. Each display pixel circuit may typically be connected to one scan trace and one data trace. Typically, power is applied to the scan traces one at a time and while power is applied to a particular scan trace, the display pixel circuits associated with the powered scan trace may be individually controlled by signals applied to their respective data traces.

The use of a scanning arrangement allows the number of individual traces that must be accommodated for a display to be reduced from potentially millions of traces to hundreds or thousands of traces. This, however, is still an undesirably large number of traces to deal with, and so display panels often include one or more driver chips that communicate with each data trace and scan trace and that translate image data provided from an input or set of inputs into sequential sets of scan signals and data signals that are output to the scan traces and the data traces. Driver chips are typically connected to a processor or other device that provides image data via a flex cable having tens or hundreds of conductors. Thus, a multi-million pixel display may be controlled by a flexible cable having a drastically lower number of conductors, e.g., on the order of 4-6 orders of magnitude lower.

Such driver chips may be considerably smaller in footprint than the display may be. To accommodate such a size differential, the spacing between the data traces and/or scan traces may be reduced between the display pixel circuit array and the driver chip. From the perspective of the driver chip, the traces may appear to "fan out" towards the array of display pixel circuits, referred to herein as "fanout." To accommodate the driver chip or chips and the respective fanout, the TFT backplane may be sized larger than the array of display pixel circuits. In some cases, the fanout does not terminate at a driver chip, but instead terminates at a flex cable connection. The driver chip in such cases may be located on a component at the opposing terminal end of the flex cable.

The present inventors have realized that the TFT backplane for a display module may, within minimal or no alteration of existing circuit patterning, be designed to accommodate a second array of pixel circuits in the vicinity of the fanout. Such a second array of pixel circuits may be used to provide ultrasonic sensing functionality to a non-display region of the display device; accordingly, the pixel circuits in the second array may be referred to herein as sensor pixel circuits (as opposed to the display pixel circuits discussed earlier). Such sensing functionality may, for example, be used to provide an ultrasonic fingerprint sensing capability. The present inventors have further realized that this may be of particular interest in mobile electronic devices to allow for biometric identification measures to be implemented in an aesthetically-pleasing manner on the device to help secure the device and the data therein in the event of loss or theft.

Figure 4:
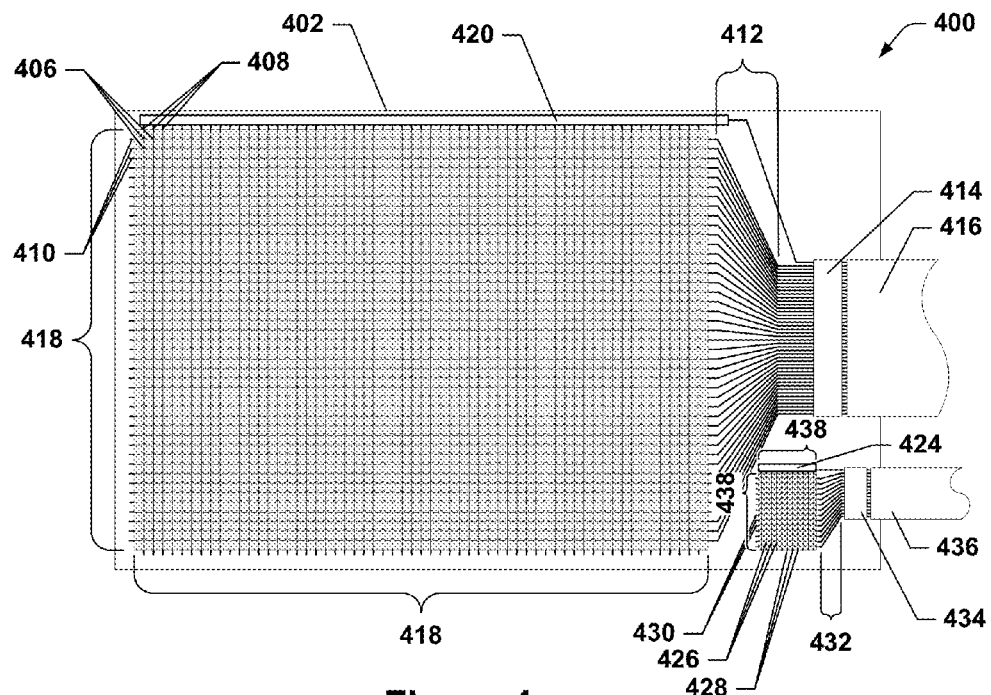
FIG. 4 depicts an example of a display module with an integrated ultrasonic biometric sensor.

FIG. 4 depicts a schematic plan view of a conceptual 43 by 59 pixel display device (2537 pixels total); a display pixel circuit 406 is associated with, and located in the vicinity of, each pixel and is located on a backplane 402. In this example, display scan traces 408 are associated with each column of display pixel circuits 406, and display data traces 410 are associated with each row of display pixel circuits 406. A display driver chip 414 is located to one side of display pixel array 418. A display scan select circuit 420 may be configured for individual control of each display scan trace 408. The display scan select circuit 420 may be driven from the display driver chip 414 or by another source. The display data traces 410 are routed through display fanout 412 so as to accommodate the difference in spacing between the display data traces 410 and the pinout spacing of the display driver chip 414. A display flex cable 416 may be connected with input/output traces of the display driver chip 414 to allow the display module 400 to be communicatively connected with other components, e.g., a processor, that may send data to the display module 400 for output.

Also depicted in FIG. 4 is a smaller array of sensor pixel circuits 426 in sensor pixel array 438. Each sensor pixel circuit 426 in the sensor pixel array 438 may be connected to a sensor scan trace 428 and a sensor data trace 430. The data traces 430 may be routed to a sensor driver chip 434 via a sensor fanout 432. A sensor scan select circuit 424 may be configured for individual control of each sensor scan trace 428. The sensor scan select circuit 424 may be driven from the sensor driver chip 434 or by another source. A sensor flex cable 436 may be connected to the pinouts of the sensor driver chip 434. Each sensor pixel circuit 426 may include one or more TFTs and, in some implementations, one or more other circuit elements such as capacitors, diodes, etc. In contrast to the display pixel circuits 406 that drive the display pixels, which may be configured to supply voltage or current to a liquid crystal element or to an OLED element, the sensing elements 426 may instead be configured to receive electrical charges produced by a piezoelectric ultrasonic receiver layer overlaying the sensor pixel array 438.

It is to be understood that the components shown in FIG. 4 are not drawn to scale, and that other implementations may differ significantly from that shown. For example, the pixel resolution of the display shown is relatively small, but the same backplane arrangement may be used with higher-resolution displays, e.g., 1136×640 pixel displays, 1920×1080 pixel displays, etc. In the same manner, the sensor pixel array may be larger than the 11×14 pixel sensor pixel array 438 shown. For example, the resolution of the sensor pixel array 438 may produce a pixel density of approximately 500 pixels per inch (ppi), which may be well-suited for fingerprint scanning and sensing purposes.

In the implementation shown in FIG. 4, the display pixel array 418 and the sensor pixel array 438 are, aside from being located on a common backplane 402, otherwise entirely separate from one another. The display pixel array 418 communicates with its own display driver chip 414 and display flex cable 416, and the sensor pixel array 438 communicates with its own sensor driver chip 434 and sensor flex cable 436.

Figure 5:
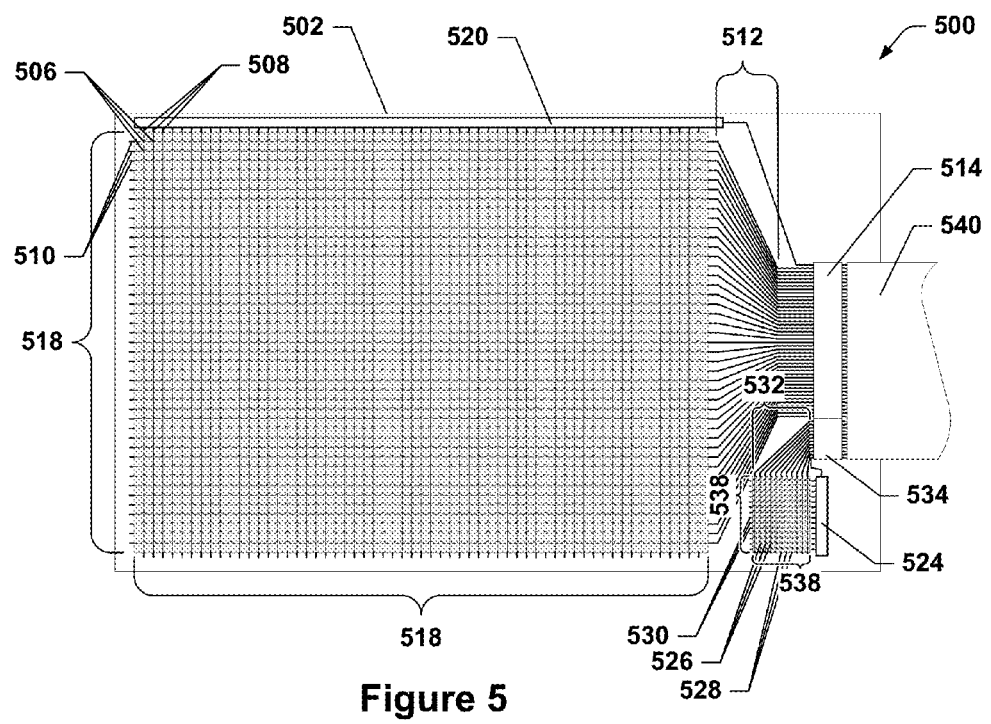
FIG. 5 depicts another example of a display module with an integrated ultrasonic biometric sensor.

A more integrated version of the display module 400 is depicted in FIG. 5. In FIG. 5, the structures shown are, in large part, identical to those shown in FIG. 4. Elements in FIG. 5 that are numbered with callouts having the same last two digits as similar structures in FIG. 4 are to be understood to be substantially similar to the corresponding structures in FIG. 4. In the interest of avoiding repetition, the reader is referred to the earlier description of such elements with respect to FIG. 4 with regard to FIG. 5.

One notable difference between FIG. 4 and FIG. 5 is that the display driver chip 514 and the sensor driver chip 534 are adjacent to one another and are connected to a common touch and ultrasonic flex cable 540. In some implementations, the functionality of the display driver chip 514 and the sensor driver chip 534 may be provided by a single, integrated chip.

The configurations shown in FIGS. 4 and 5 may be implemented in existing TFT backplanes with little difficulty since no change to the display pixel array 418/518 is needed. Additionally, the sensor pixel circuits 426/526, e.g., the TFTs and other circuit elements that form the sensor pixel circuits 426/526, may be formed during the same processes that are used to form the display pixel circuits 406/506. TFT backplane manufacturers are thus spared any redesign of the display pixel array 418/518, allowing fingerprint scanning functionality to be added to an area adjacent to the display pixels at a reduced development cost. Moreover, the actual production of a TFT backplane with a sensor pixel array 438/538 such as that shown may involve negligible additional cost since the same processes already used to produce the display pixel array 418/518 may be leveraged to concurrently produce the sensor pixel array 438/538.

Figure 6:
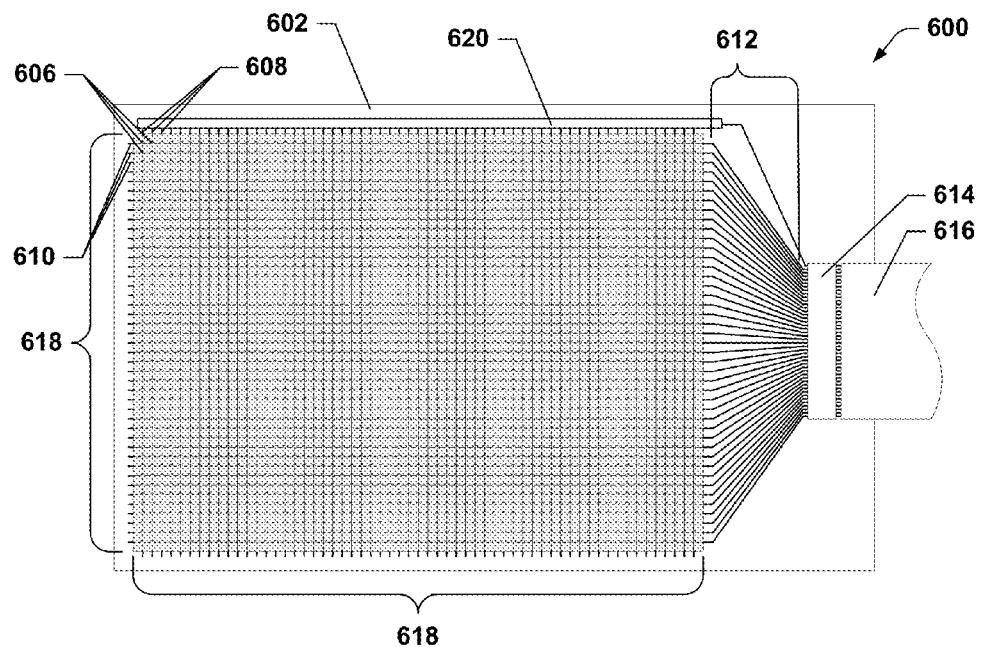
FIG. 6 depicts an example of a display module without an integrated ultrasonic biometric sensor.
Figure 7:
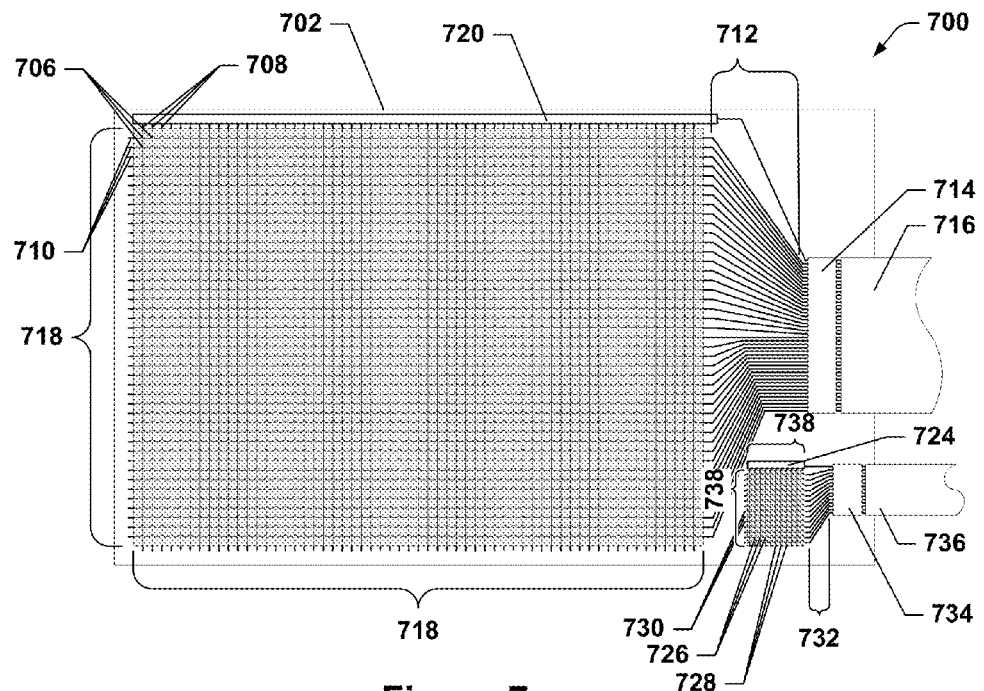
FIG. 7 depicts the example of the display module of FIG. 6 with a fanout modified to accommodate an integrated ultrasonic biometric sensor.

In some implementations, some re-routing of the display fanout may be performed to allow for a larger size second TFT array to be placed on the backplane. FIGS. 6 and 7 depict an example of such re-routing. In FIG. 6, a display module 600 with a display pixel array 618 is shown. The display module 600 does not have an accompanying sensor pixel array, but is otherwise very similar to the display modules shown in FIGS. 4 and 5. In FIG. 7, a display module 700 is depicted that is substantially identical to the display module 600 except that a sensor pixel array 738, with accompanying sensor data traces 730, scan traces 728, sensor driver chip 734, etc., has been added to backplane 702. As can be seen, the only modification to the backplane 602 that is needed to produce the backplane 702 is to re-route some of the data traces 610 in the display fanout 712. Such minor alterations in trace routing may have a low impact on redesign costs associated with converting an existing display module 600's design so as to resemble the display module 700's design.

Figure 8A:
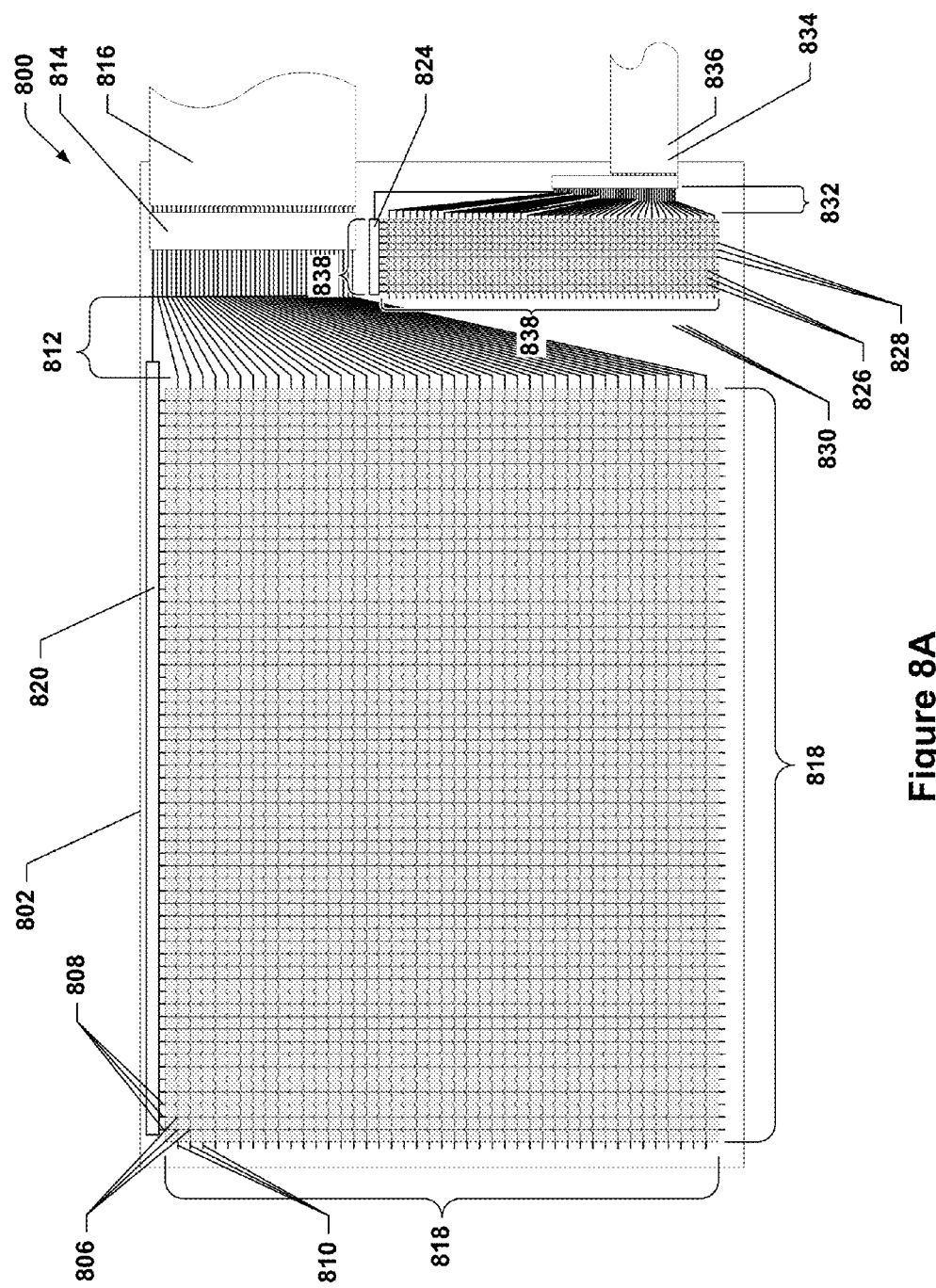
FIG. 8A depicts the example of the display module of FIG. 4 with a high-width ultrasonic biometric sensor.

FIG. 8A depicts the example of the display module of FIG. 4 with a high-width ultrasonic fingerprint sensor. In FIG. 8A, the structures shown are, in large part, identical to those shown in FIG. 4. Elements in FIG. 8A that are numbered with callouts having the same last two digits as similar structures in FIG. 4 are to be understood to be substantially similar to the corresponding structures in FIG. 4. In the interest of avoiding repetition, the reader is referred to the earlier description of such elements with respect to FIG. 4 with regard to FIG. 8A.

As can be seen, the sensor pixel array 838 in FIG. 8A is considerably larger in width, i.e., across the vertical direction in the Figure, than the sensor pixel array 438 is in FIG. 4. This may allow multiple fingertips to be placed on the sensor pixel array 838 simultaneously, allowing for simultaneous fingerprint recognition across multiple fingertips. Moreover, such larger-footprint sensor pixel arrays may also be used to obtain other biometric information, e.g., a palm print (or partial palm print) may be obtained when a person presses the palm of their hand against the cover glass of the display. In the same manner, other biometric data may be obtained when other portions of a human body are pressed against the cover glass, e.g., ear prints, cheek prints, etc. At the same time, a larger sensor pixel array may also allow for additional input functionality. For example, the sensor pixel array may be configured to detect when a stylus is in contact with the cover glass and to track the motion of the stylus. The resulting XY position data for the stylus tip may be used, for example, to obtain the signature of a user, or to receive stylus input for purposes such as text input or menu selections. Depending on the packaging arrangement, the sensor pixel array may be located as shown, i.e., on the same side of the display module 800 as the display fanout 812, or may be located on the opposite side of the display module 800, i.e., on the opposite side of the display pixel array 818 from the display fanout 812. In the former case, the sensor pixel array 838 may have to share backplane real estate with the display fanout 812. In the latter case, the sensor pixel array 838 may extend relatively unimpeded across the entire width (vertical height, with respect to the orientation of FIG. 8A) of the display module 800. In implementations where the sensor pixel array 838 and the display pixel array 818 do not share a common backplane, then a full-width sensor pixel array 838 may be implemented that does not interfere with the display fanout 812 while still being located on the same side of the display pixel array 818 as the display fanout 812.

Figure 8B:
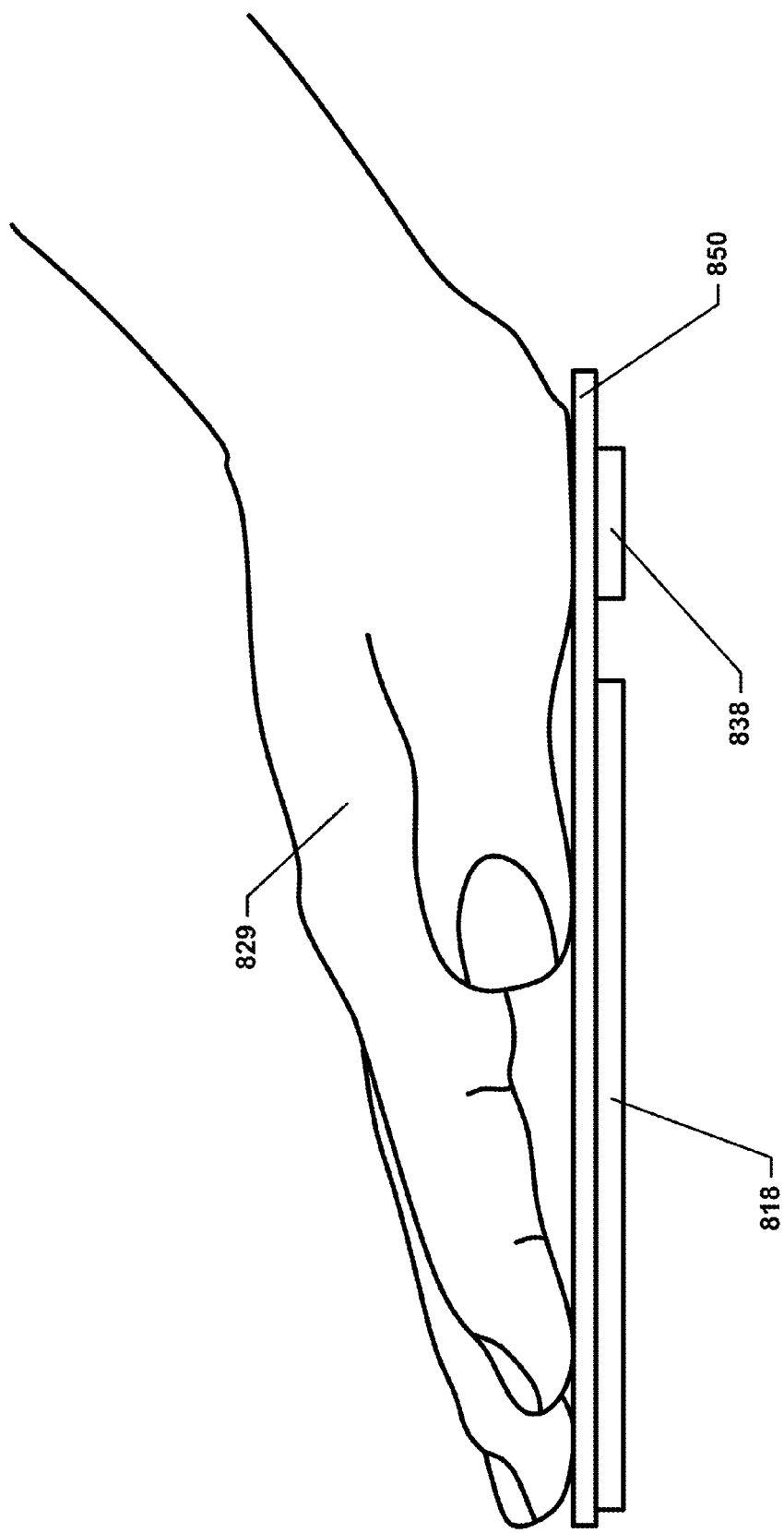
FIG. 8B depicts a side view of an example display module with a high-width ultrasonic biometric sensor used as a palm-print sensor.

FIG. 8B depicts a side view of an example display module with a high-width ultrasonic fingerprint sensor used as a palmprint sensor. As can be seen, a user may press the palm of their hand 829 against a cover glass 850 that overlies a display pixel array 818 and a sensor pixel array 838. When the sensor pixel array 838 is a wide array, such as is shown in, for example, FIG. 8A, then the sensor pixel array 838 may be used to obtain a partial or whole palmprint reading of the user's palm using ultrasonic technologies as outlined herein.

FIG. 9 depicts a conceptual side view of a display module 900 that is configured in much the same manner as the display module 400 of FIG. 4. In FIG. 9, the display module 900 includes a backplane 902 that has a display TFT array 918 formed thereon. The display TFT array includes a plurality of display TFT circuits 906 arranged in a regular pattern. A liquid crystal layer 958 may be located on top of the backplane 902 and the display TFT array 918; the liquid crystal layer 958 may have individual liquid crystal cells that are each associated with a different display TFT circuit 906. A liquid crystal electrode layer 962 may be located on the opposite side of the liquid crystal layer 958. Applying a voltage between the liquid crystal electrode layer 962 and one of the display TFT circuits 906 may cause the individual liquid crystal cell located between the liquid crystal electrode layer 962 and the display TFT circuit 906 to change state, thus causing more or less twist of polarized light passing through the liquid crystal cell.

A backlight 960 may be located on the opposite side of the backplane 902 from the display TFT array 918. A first polarizer 952 may be interposed between the backplane 902 and the backlight 960, and a second polarizer 954 may be located on the opposite side of the liquid crystal layer 958 from the first polarizer 952. The first polarizer 952 and the second polarizer 954 may be oriented such that their polarization directions are perpendicular to one another.

Also visible in FIG. 9 is a color filter array 956 that is placed between the second polarizer 954 and a cover glass 950. The color filter array 956 may filter the light that passes through individual liquid crystal cells and the first and second polarizers 952 and 954 so that each individual liquid crystal cell is substantially monochromatic. Different wavelengths of monochromatic light from adjacent pixels may be combined to produce a large and varied color range. Of course, in a two-color display, e.g., white and black, the color filter array 956 may be omitted. In a field-sequential multi-color display, the color filter array 956 may also be omitted, as sequentially colored backlights (e.g. red then green then blue) provide the desired colored light as the display TFT circuits 906 and the liquid crystal layer 958 rapidly change states corresponding to the lighting sequence and the image to be displayed.

Also shown in FIG. 9 are a piezoelectric ultrasonic receiver layer 972 and a piezoelectric ultrasonic transmitter layer 970. The piezoelectric ultrasonic transmitter layer 970 is, in this case, located on the opposite side of the backplane 902 from the cover glass 950, and the piezoelectric ultrasonic receiver layer 972 is interposed between the backplane 902 and the cover glass 950. In some other implementations, however, the locations of the piezoelectric ultrasonic transmitter layer 970 and the piezoelectric ultrasonic receiver layer 972 may be swapped, or both the piezoelectric ultrasonic transmitter layer 970 and the piezoelectric ultrasonic receiver layer 972 may be located on the same side of the backplane 902.

The piezoelectric ultrasonic transmitter layer 970 may, when a voltage is applied across a first transmitter electrode 978 and a second transmitter electrode 980, produce a planar ultrasonic wave that is directed towards the cover glass 950. By timing the application of the voltage across the first transmitter electrode 978 and the second transmitter electrode 980, the timing and duration of the ultrasonic waves produced by the piezoelectric ultrasonic transmitter layer 970 may be modulated.

The piezoelectric ultrasonic receiver layer 972 such as a layer of PVDF or PVDF-TrFE may include piezoelectric crystals that produce measurable electrical charges when subject to acoustic pressure caused from incident ultrasonic waves. A piezoelectric crystal in the piezoelectric ultrasonic receiver layer 972 may be bracketed between a common receiver layer electrode 976 and one of a plurality of pixel input electrodes 974. Any charges produced by the piezoelectric crystals associated with a particular pixel input electrode 974 may be detected by a sensor pixel circuit 926 that is conductively connected to the pixel input electrode 974. This is the case for most of the piezoelectric crystals, although some piezoelectric crystals in the piezoelectric sensor layer may not be so bracketed (for example, if round pixel input electrodes are used, the piezoelectric crystals overlaying the interstices between adjacent pixel input electrodes may not be so bracketed). Each pixel input electrode 974 may have a nominal width in one direction that is greater than about 70% of the pixel pitch distance in that direction and that is also less than the pixel pitch distance in that direction. In some implementations, the pixel input electrode 974 may have a nominal width in one direction that is greater than about 50% of the pixel pitch distance in that direction and that is also less than the pixel pitch distance in that direction. In other implementations, e.g., non-imaging implementations such as buttons or slider controls (see later discussion herein), the pixel input electrode dimensions may be considerably smaller than the pixel pitch.

When the pixel input electrodes 974 and the sensor pixel circuits 926 are arranged in a two-dimensional array, e.g., an arrangement similar to the arrangement of the pixel input electrodes 38 and the sensor pixel circuits 32 of FIG. 2, the resulting array may be used to provide a two-dimensional map of ultrasonic wave intensity/pressure within the piezoelectric ultrasonic receiver layer 972 that corresponds to the reflection intensity of the ultrasonic wave at the exposed surface of the cover glass 950, which may act in a manner similar to the platen 40 of FIG. 2.

The stacked piezoelectric ultrasonic transmitter layer 970, first and second transmitter electrodes 978 and 980, backplane 902, sensor pixel circuits 926, pixel input electrodes 974, piezoelectric ultrasonic receiver layer 972, piezoelectric ultrasonic receiver layer electrode 976, and cover glass 950 may form a substantially contiguous block of material so as to avoid the presence of void spaces such as air gaps within the stacked assembly. This prevents or reduces acoustic impedance mismatches between the various materials through which an ultrasonic wave generated by the piezoelectric ultrasonic transmitter layer 970 may travel as it passes through the stacked assembly and towards the exposed surface of the cover glass 950. In some implementations, the ultrasonic sensor-related components shown in FIG. 9 that may be located between the backplane 902 and the cover glass 950 may have an overall thickness that is less than the gap distance between the cover glass 950 and the backplane 902. In such implementations, the remaining space may be filled with a spacer glass or other material to avoid the presence of an open gap. The various layers/components in the ultrasonic sensor stack may be bonded to one another with adhesives or via other mechanisms to avoid potential open gaps.

While the components and layers shown in FIG. 9 are not drawn to scale, ultrasonic fingerprint sensors may be implemented on a very small scale. For example, the piezoelectric layers used for the piezoelectric ultrasonic transmitter layer and the piezoelectric ultrasonic receiver layer may be on the order of 0.005 to 0.1 mm in thickness, the transmitter and receiver bias electrodes may be on the order of 0.0001 to 0.02 mm in thickness, the cover glass and the backplane may be on the order of 0.1 to 1 mm in thickness, and the sensor pixel circuits and pixel input electrodes may be on the order of 0.0005 to 0.002 mm in thickness. These thickness values are merely provided as an example and to give the reader a sense of the approximate scale of an ultrasonic fingerprint sensor. These components may also have thicknesses other than those listed.

Ultrasonic sensor arrays may also be integrated into a display module design in other ways. For example, ultrasonic sensor arrays may be integrated into some touch-sensitive display modules as set forth below.

In some displays with touch interface functionality, a touch input layer may be sandwiched between the various display components, e.g., components such as polarizers, backplanes, color filters, liquid crystal layers, OLEDs, etc., and the cover glass. In some such devices, the touch input layer may be formed on the back side of the cover glass. The touch input layer may, for example, be a projected capacitive touch (PCT) input layer and may utilize a pattern of conductive traces that form an array of variable capacitors that can be used to detect locational changes in capacitance caused by the presence of a finger in the vicinity of the array.

Such touch input layers may be connected to a flex cable to allow for electrical communication between the touch input layer and, for example, a touch controller. The flex cable may be soldered or otherwise connected to contacts in the touch input layer located along or near one edge of the display module.

An ultrasonic sensor, such as that depicted in FIG. 2, may be bonded to the cover glass of such a display module and may be electrically connected to the same flex cable used to connect with the touch input layer. Such an arrangement is shown in FIG. 10.

In FIG. 10, a conceptual side view of a display module similar to that shown in FIG. 9 is shown. Components in FIG. 10 that are numbered with the same last two digits as components in FIG. 9 may, unless otherwise described, be assumed to be substantially similar to the components in FIG. 9 that are numbered with the same last two digits and described earlier in this disclosure.

As can be seen in FIG. 10, a touch layer 1064 has been interposed between the second polarizer 1054 and the cover glass 1050. The touch layer 1064 may, for example, be bonded to the second polarizer 1054 with an adhesive layer 1082. A portion of the touch layer 1064 may protrude beyond the edge of the second polarizer 1054 so as to allow touch flex leads 1090 of a touch flex cable 1088 to be connected to conductive traces of the touch layer 1064.

As may be further seen in FIG. 10, the ultrasonic sensor portion of the display module 1000 is slightly different than the ultrasonic sensor portion of FIG. 9. In FIG. 10, the ultrasonic sensor, as in FIG. 9, includes a piezoelectric ultrasonic transmitter layer 1070 and a piezoelectric ultrasonic receiver layer 1072, as well as pixel input electrodes 1074 and sensor pixel circuits 1026. However, in contrast to the variant shown in FIG. 9, the sensor pixel circuits 1026 are provided on an ultrasonic sensor backplane 1004 that is separate from the backplane 1002. Furthermore, a spacer 1084 is located between the receiver bias electrode 1076 and the cover glass 1050. The spacer 1084 may be used to allow ultrasonic flex leads 1092 of touch flex cable 1088 to be conductively connected to the surface of the receiver bias electrode 1076 that faces the cover glass 1050. This allows a flex cable with exposed conductors on only one side of the terminal end that connects to the touch layer 1064 and the receiver bias electrode 1076 to be used as the touch flex cable 1088. The touch flex cable 1088 may be split along its length for some distance to allow the touch flex cable leads 1090 and the ultrasonic cable leads 1092 to be routed in opposite directions, as shown. If a flex cable with exposed conductors on both sides of the terminal end is used, then the spacer 1084 may be omitted.

The split-flex arrangement shown in FIG. 10 may also be implemented on display modules having ultrasonic fingerprint sensors with sensor pixel circuits that share a common backplane with display pixel circuits, e.g., such as is shown in FIG. 9. In FIG. 10, the touch flex cable 1088 is shown passing between the second transmitter electrode 1080 and the backplane 1002, i.e., taking advantage of a gap between the ultrasonic component stack and the backplane 1002 that may be provided in display modules where the display pixel circuits 1006 and the sensor pixel circuits 1026 are located on separate backplanes, e.g., backplane 1002 and ultrasonic sensor backplane 1004, rather than on a common backplane. However, a touch flex cable similar to the touch flex cable 1088 may also be used for display modules that feature display pixel circuits and sensor pixel circuits provided on a common backplane, e.g., such as is shown in FIG. 9. In such implementations, the touch flex cable may, instead of being routed in between the ultrasonic components and the backplane, be routed to the side, i.e., into or out of the page with respect to FIG. 10. After clearing the volume occupied by the ultrasonic components, the touch flex cable may then be routed towards a desired edge of the display module 1000, e.g., any of the three edges of the display module bracketing the ultrasonic sensor components, display driver chip, etc. Since the receiver bias electrode 1076 requires only one conductive trace in order to operate, the touch flex cable may only require one additional conductor. In some implementations, the existing touch flex cable for a touch sensitive layer may already have an unused, spare conductor that may be utilized for this purpose.

Figure 11:
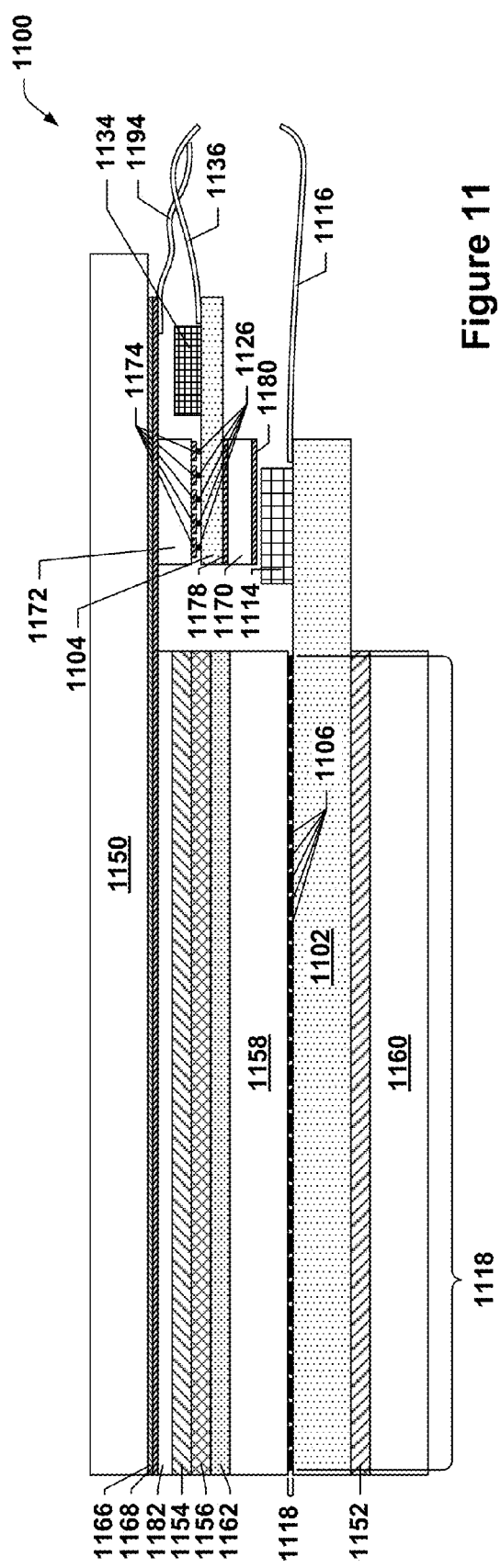
FIG. 11 depicts a conceptual side view of another example of a display module with an integrated ultrasonic biometric sensor.
Figure 13:
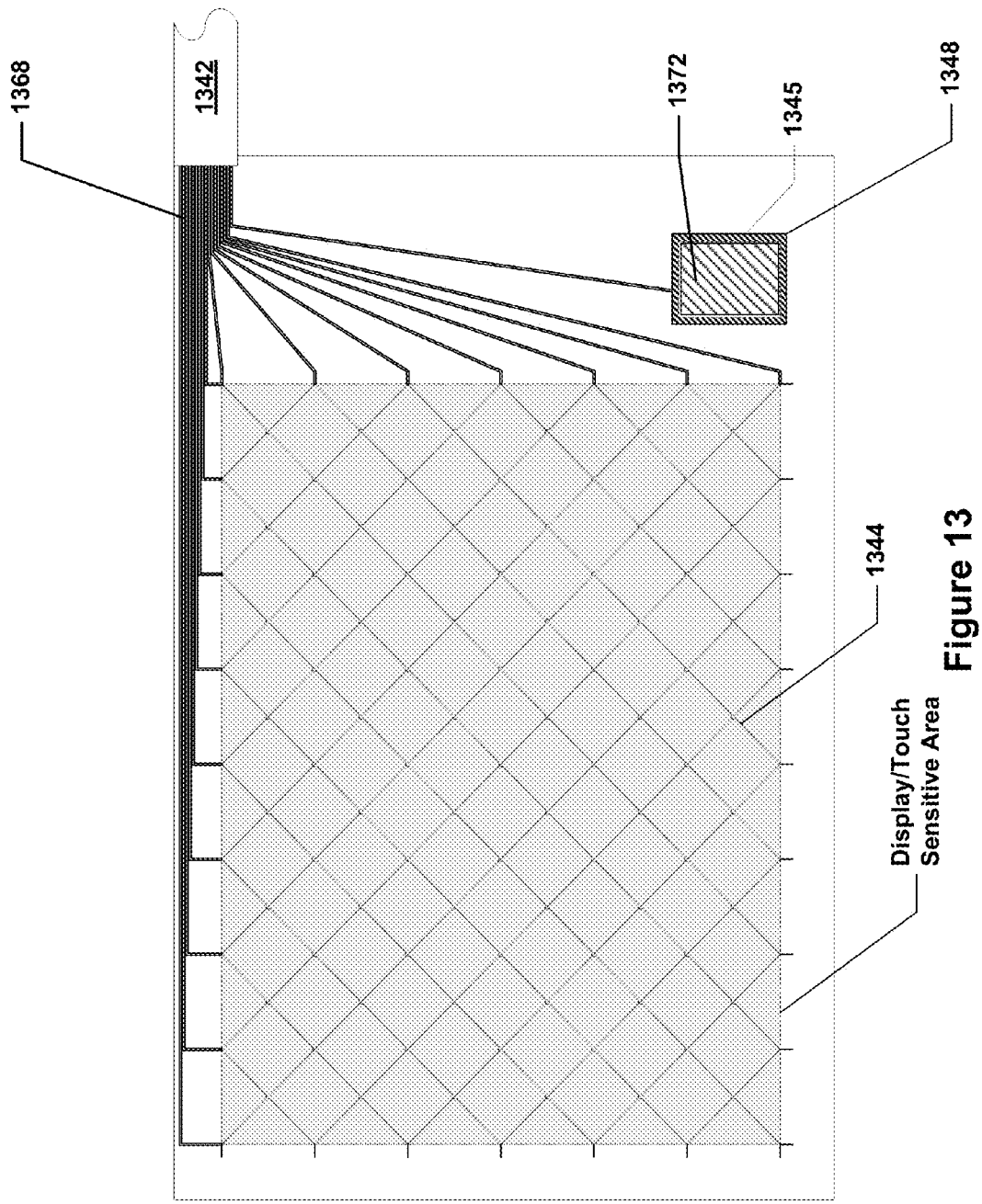
FIG. 13 depicts a conceptual plan view of a touch layer for a display module shown in FIG. 11.

In FIG. 11, a conceptual side view of another display module is depicted. Components in FIG. 11 that are numbered with the same last two digits as components in FIG. 10 may, unless otherwise described, be assumed to be substantially similar to the components in FIG. 10 that are numbered with the same last two digits and described earlier in this disclosure. FIG. 13 depicts a plan view of a touch layer for a display module that may be referred to with respect to the discussion of FIG. 11.

As in FIG. 10, the sensor pixel circuits 1126 are located on a separate ultrasonic sensor backplane 1104, although variants featuring a common backplane providing both the display pixel circuits 1106 and the sensor pixel circuits 1126 may also be used. The display module 1100 shown in FIG. 11 differs from the display module 1000 shown in FIG. 10 in that the particular implementation shown features a conductive touch layer 1166 and a silver ink layer 1168. For example, if the touch layer 1064 from FIG. 10 is a resistive touch layer, it may feature a grid of overlapping, but non-contacting, conductive traces (see FIG. 13, conductive traces 1344) over the display area of the display module. The conductive traces 1344 may be formed from a transparent conductive material, e.g., indium-tin-oxide (ITO), thus forming a structure similar to the conductive touch layer 1166. The conductive touch layer may feature a plurality of separate electrical traces that allow each grid trace to be separately addressed. To enhance electrical performance of the conductive touch layer 1166, the conductive touch layer 1166 may be electrically "reinforced" using an additive layer of electrically reinforcing conductive materials, e.g., silver ink 1368 or other high-conductivity material such as a silver-urethane coating, a filled polymer, a conductive paste, a conductive ink, a screen-printed conductor, or an electrically conductive coating. Such materials may typically be applied to the traces of the conductive touch layer 1166 in areas that do not overlap the display area of the display module, as such higher-conductivity materials are typically opaque or reflective.

The traces connected to the grid traces may be connected to a flex cable 1342 that may be connected to a processor that may receive and/or process touch input. In some touch sensors, there may be driver chips located cover glass 1150 (or, more accurately, on the conductive touch layer 1166 or the silver ink layer 1168) that may assist in signal conditioning, A/D conversion, and/or touch sensing.

In implementations such as the one shown in FIG. 11, the receiver bias electrode may be provided by a region 1345 of the conductive touch layer 1166 that is in contact with the piezoelectric ultrasonic receiver layer 1172. This region 1345 may be electrically isolated from the other traces in the conductive touch layer 1166, and may be electrically connected to the same flex cable 1342 used to interface with the conductive touch layer 1166 via a trace in the conductive touch layer 1166. The trace that electrically connects the region with the flex cable, as well as the conductive touch layer 1166 encircling the region (the encircling portion is indicated by 1348) that is in contact with the piezoelectric ultrasonic receiver layer 1172 may be electrically reinforced or augmented with silver ink from the silver ink layer 1168 as well. The portion of the conductive touch layer that actually overlays the piezoelectric ultrasonic receiver layer 1172, however, may be kept free of silver ink. This may be done to prevent the silver ink, which is a metallic compound, from being in the direct transmission path of ultrasonic waves produced by the piezoelectric ultrasonic transmitter layer 1170 and received by the piezoelectric ultrasonic receiver layer 1172. The high acoustic impedance of such a metallic compound with respect to the acoustic impedance of the piezoelectric ultrasonic receiver layer 1172 may result in a large fraction of incident ultrasonic waves being reflected back from the metallic compound rather than passing through the cover glass 1150 so as to permit scanning of an object on the cover glass. Accordingly, the portion of the conductive touch layer that overlays the piezoelectric ultrasonic receiver layer 1172 should generally be kept free of materials with a high acoustic impedance mismatch with respect to the adjacent materials.

Electrical reinforcement around the portion of the conductive touch layer that overlays the piezoelectric ultrasonic receiver layer 1172 may be useful since the piezoelectric ultrasonic receiver layer 1172 may, when biased to generate image data, temporarily consume a large amount of current. The amount of current may be large enough that materials used to produce the conductive touch layer 1166, e.g., ITO, may, in combination with the typical trace thicknesses used, be unable to conduct current sufficiently without dropping undue amounts of voltage across the surface of the receiver layer 1172. If the trace that connects the portion of the conductive touch layer that overlays the piezoelectric ultrasonic receiver layer 1172 with the flex cable is electrically reinforced with a high-conductivity material, however, this concern may be addressed.

In some of the Figures discussed herein, various electrical connections are shown as being provided via a flex cable (sometimes referred to as a flexible printed circuit or FPC) of some sort. It is to be understood that while flex cables are well-suited to such connections (due to a high density of conductors, ease of tailoring the flex cable to a particular routing path, and low manufacturing cost), other electrical connection techniques may be used to connect the various components discussed with processors, drivers, and/or other control hardware. For example, individual wires may be used to make some electrical connections, e.g., an individual wire may be used to make an electrical connection to a single element, such as the receiver bias electrode of the ultrasonic fingerprint sensor, or an inter-layer via may be used, e.g., an insulated conductive post that passes through the piezoelectric ultrasonic receiver layer and in conductive contact with the receiver bias electrode and a driver circuit on the backplane providing the sensor pixel circuits. It is to be further understood that while specific electrical connections to various electrical components are not shown in many of the Figures to avoid undue clutter, a person of ordinary skill in the art would recognize that such electrical components would be electrically connected to various control, signal and power systems. For example, the first and second transmitter electrodes would be connected to a driver circuit to allow a voltage to be applied across the piezoelectric ultrasonic transmitter layer. Recognizing and establishing such electrical connections is within the skill of someone of ordinary skill in the art.

It is also be recognized that one or more of the various components described herein may be electrically connected to various other components, e.g., processors, via a common cable, e.g., a single flex cable. For example, a single flex cable may be used to provide electrical connections between a processor or printed circuit board and a touch layer and an ultrasonic fingerprint sensor of a display module. While such arrangements may reduce the overall number of cables that may need to be made and routed within a particular device, such cable integration is not strictly necessary. Accordingly, in some implementations, a flex cable or other type of cable may be electrically connected to only one component, e.g., a flex cable may be connected only with a sensor driver chip for an ultrasonic fingerprint sensor.

In many of the examples contained herein, sensor driver chips (and display driver chips) were discussed. In the illustrated examples, these chips were located on the backplane or backplanes of a display module having an ultrasonic fingerprint sensor; this is referred to as "chip-on-glass" (COG) in the industry. It is to be understood that such chips, and the circuits they house, may be located in other locations as well, including in locations completely separate from the display module. For example, one or more of such chips may be integrated into or onto a flex cable, which is referred to as "chip-on-flex" (COF) in the industry. In another example, one or more of such chips may be located on a circuit board connected to the opposing end of the flex cable. It is to be understood that display modules with integrated ultrasonic fingerprint touch sensors that feature such alternate chip placements are also within the scope of this disclosure.

While the present disclosure has focused primarily on the integration of arrayed piezoelectric ultrasonic sensors for fingerprint recognition, the ultrasonic sensor integration concepts outlined herein may also be applied to single-pixel (or other, reduced pixel-count sensors of unsuitable resolution for fingerprint scanning purposes) ultrasonic sensors. For example, an ultrasonic sensor having a single, large receiver pixel (a sensor pixel array where the number of sensor pixel elements in the array is 1, i.e., a single sensor pixel element) may be capable of detecting when a finger is placed on top of it, but may be completely unable to provide any useful information regarding the actual fingerprint of that fingerprint. Instead, it may simply provide a single-pixel "average" of the fingerprint detail. This "average" image of the fingerprint is nonetheless useful since such an averaged image will be significantly different when a finger is present on the cover glass over such a sensor than it would be when a finger is not present on the cover glass. Thus, the single-pixel ultrasonic sensor may be used as a simple digital button—when a finger is present on the cover glass over the sensor, it may be detected and treated as a button press. Conversely, if no finger is present, this may also be detected and treated as a button non-press or a button release.

Such "button" ultrasonic sensors may, in essence, require a single sensor pixel circuit, referred to herein as a "button pixel circuit." Their implementation as compared to the arrayed sensor pixel circuits useful for fingerprint scanning is thus relatively simple. The button pixel circuit may be formed in the same backplane that provides display pixel circuits for the display module, e.g., as an additional pixel circuit in addition to the sensor pixel circuits in the sensor pixel array and in addition to the display pixel circuits in the display pixel array. There may be multiple individual button pixel circuits provided on a single backplane to allow for multiple, discrete buttons. Such button pixel circuits may be connected to other components on the backplane, or may be connected to a flex cable. Any display fanout or sensor fanout may be re-routed so as to stay free of the button pixel circuits.

Figure 12:
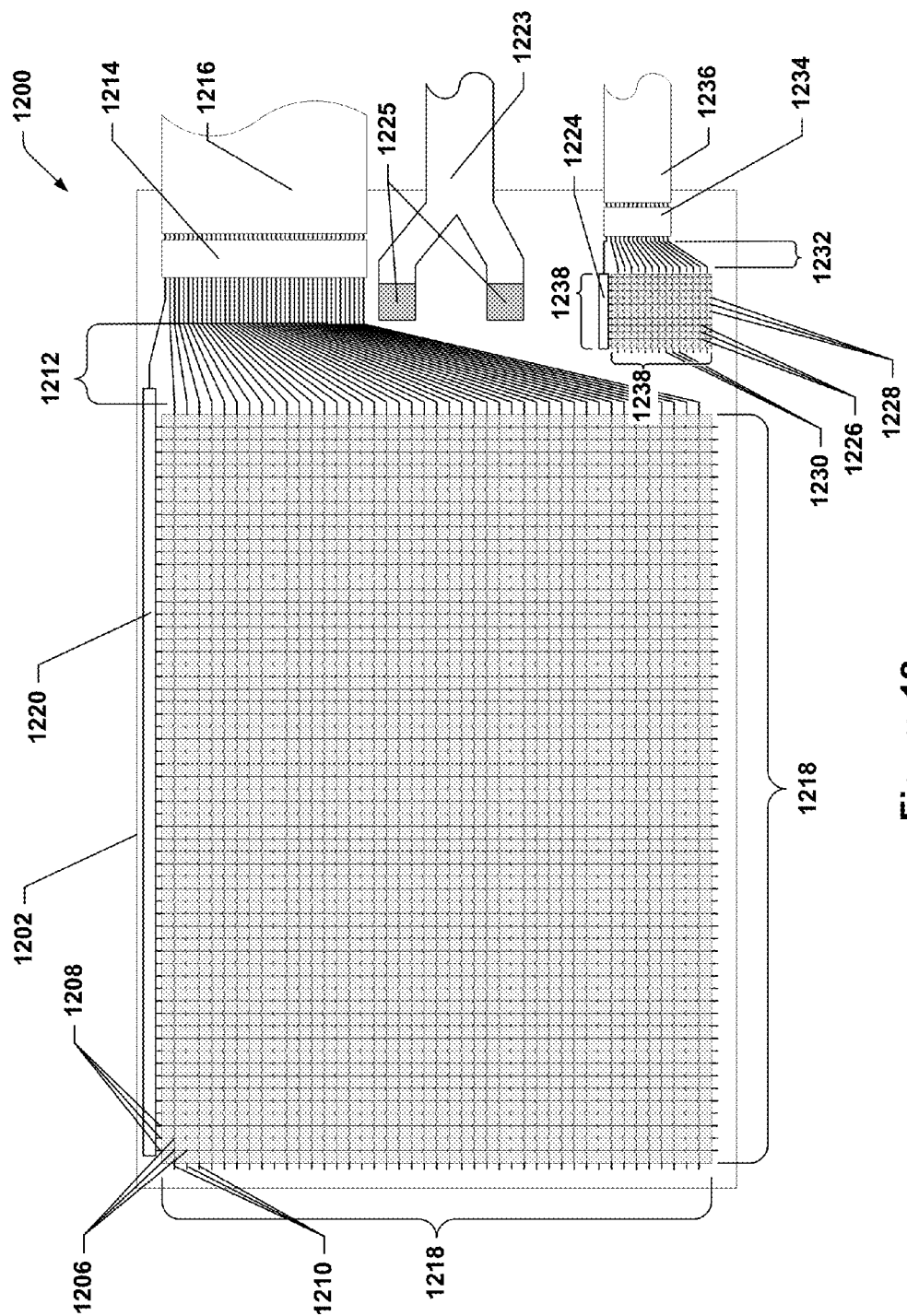
FIG. 12 depicts a plan view of a display module similar to that shown in FIG. 4 but with additional ultrasonic buttons integrated onto the backplane.

FIG. 12 depicts a plan view of a display module similar to that shown in FIG. 4 but with additional ultrasonic buttons integrated onto the backplane. In FIG. 12, the structures shown are, in large part, identical to those shown in FIG. 4. Elements in FIG. 12 that are numbered with callouts having the same last two digits as similar structures in FIG. 4 are to be understood to be substantially similar to the corresponding structures in FIG. 4. In the interest of avoiding repetition, the reader is referred to the earlier description of such elements with respect to FIG. 4 and with regard to FIG. 5.

As can be seen in FIG. 12, the display driver chip 1214 is offset from the center of the display module, freeing up a portion of the backplane 1202 and allowing for the integration of two ultrasonic button sensors 1225 onto the backplane. As discussed above, the ultrasonic button sensors 1225 may be single-pixel ultrasonic devices; the single pixel circuit for each of the ultrasonic button sensors may be provided on the backplane, much as the display pixel circuits 1206 and the sensor pixel circuits 1226. A button flex cable 1223 may connect the ultrasonic button sensors 1225 to a controller or other device configured to control the ultrasonic button sensors 1225. Much as two button sensors 1225 may be formed on the backplane 1202, a series of ultrasonic buttons 1225 such as a linear array may be formed on the backplane. In one configuration, a set of buttons may be positioned in a linear array, forming an ultrasonic slider control that may be used for volume control purposes or as a gesture input device such as a swipe sensor to turn on or unlock a mobile device when a user swipes a finger across the sensor. In one operating mode, a user may power up a mobile device with a swipe of a finger, and then place the tip of the finger onto the fingerprint sensor to validate the user and unlock the mobile device. In another operating mode, a user may tap one or more of the ultrasonic buttons or the linear array to wake up the mobile device and then place a finger on the ultrasonic fingerprint sensor to be authenticated. A specific sequence of taps such as tap-tap-pause-tap on one or more buttons may allow the user to access the mobile device or to use an application that runs on the mobile device. In another configuration, three or more ultrasonic buttons may be positioned near the periphery of a display to serve as, for example, a back button, a home button, or a menu/enter/select button. These buttons may provide access to these or other functions with or without user authentication capability within the button. The buttons may have as few as one pixel suitable for detecting a touch on the button. Alternatively, the buttons may have a high-resolution array of sensor pixels to detect a touch and to authenticate a user before executing a function. In one operating mode, the buttons may detect acoustic emissions or changes in capacitance to determine the presence of a finger or other object without turning on the ultrasonic transmitter. In another mode, the buttons may detect the presence of an object using image information generated from the sensor while operating the ultrasonic transmitter. In another mode, the buttons may first detect the presence of an object without the transmitter on, and then generate further information about the object while operating the transmitter. The cover glass or cover lens above the ultrasonic buttons may be roughened or otherwise textured to aid in the generation of sound when, for example, a user brushes his/her finger over the button.

In another configuration, a rectangular array of ultrasonic pixels may form a touchpad or a signature pad that is off to one side of the display region. The touchpad or signature pad may be used to, for example, provide navigational input to operations of a display device or to allow signature verification of a user with the display device. In some implementations, the region above the touchpad or signature pad may be textured to aid in detection of a stylus.

In addition to the ultrasonic fingerprint sensors discussed herein, the present inventors have realized that, in some implementations, it may be possible to omit the ultrasonic component of the fingerprint sensor completely and rely entirely on the capacitive behavior of the sensor pixel circuits that ordinarily interface with the piezoelectric ultrasonic receiver layer. For example, such sensor pixel circuits register different magnitudes of charge when the pixel input electrodes (or the underlying sensor pixel circuit connections to the pixel input electrodes) come into contact or close contact with human skin, e.g., a fingerprint ridge, as compared with air, e.g., a fingerprint valley. If the array of sensor pixel circuits has a small enough pitch, e.g., 500 ppi, then the resulting output from the array of sensor pixel circuits may be used to produce an image of the fingerprint in much the same manner as it would be used when implemented with a piezoelectric ultrasonic receiver layer. One limitation to such capacitive sensors is that they are only effective when the object being imaged, e.g., a fingerprint, is very close to the input electrodes of the sensor pixel circuit. For example, if the fingerprint is offset more than the width of a fingerprint ridge from the input electrodes of the sensor pixel circuit, the values reported out by each sensor pixel circuit will be inaccurate and a fingerprint will not be able to be reconstructed. In some implementations, a capacitively configured sensor may have an overlying coating that is between about one and twenty microns thick.

If a capacitive fingerprint sensor is used instead of an ultrasonic fingerprint sensor, the capacitive sensor may need to be mounted behind a much thinner section of a cover glass than is used over the majority of the display module, e.g., with a thickness much less than the spacing between fingerprint ridges. Alternatively, the capacitive fingerprint sensor may be located behind a protective layer of another material, e.g., Parylene, and may not be covered by the cover glass at all, e.g., located in a cutout area of the cover glass, or in a location past the edge of the cover glass.

It is also to be understood that the backplanes described herein with a first array of display pixel circuits and a second array of sensor pixel circuits may also be used in sensors other than piezoelectric sensors. For example, a sensor pixel or array of sensor pixels may be used for ambient temperature measurement or configured for magnetic field detection. The display portion and the non-display portion may have common or separate flex cables for driving the display and for acquiring data from the non-display or sensor portion.

Display modules such as those described herein may be made using a variety of processes. For example, a display module according to FIG. 9 may be made by first producing or providing a backplane having at least two separate arrays of pixel circuits: an array of display pixel circuits and an array of sensor pixel circuits (the backplane may include the pixel input electrodes for the array of sensor pixel circuits as well). Various display-related components may be assembled to the backplane as is ordinarily done during assembly of such a display module. For example, a liquid crystal layer may be applied to the side of the backplane having the array of display pixel circuits and the liquid crystals may then be oriented in the desired orientation. An electrode may then be applied to the liquid crystal layer and a color filter array and a polarizer may then be layered on top of this electrode. A backlight may then be applied to the opposite side of the backplane. Prior to, concurrently with, or after the assembly of most of the display-related components, a piezoelectric film may be applied to the pixel input electrodes to form the piezoelectric ultrasonic receiver layer. The receiver bias electrode may then be applied to the piezoelectric ultrasonic receiver layer. If necessary, a spacer, e.g., a spacer glass, may be applied to the receiver bias electrode to height-match the ultrasonic layer stack on the backplane with the display layer stack on the backplane. The cover glass, as well as any optional touchscreen interfaces, may then be bonded on the two separate stacks. In addition to the components assembled onto the pixel-circuit-side of the backplane, additional components may be assembled onto the opposite side of the backplane. For example, the backlight for the display components may be mounted onto the opposite side of the backplane. Additionally, the first transmitter electrode may be mounted onto the opposite side of the backplane as well, followed by the application of a further piezoelectric layer to form the piezoelectric ultrasonic transmitter layer. The second transmitter electrode may then be applied, and an insulating coating or a backside cap may then be applied to protect against inadvertent short circuits.

Another possible assembly technique may be used to provide display modules that feature ultrasonic fingerprint sensors that are not located underneath the cover glass; such techniques may also be used with capacitive fingerprint sensors that may not function behind the thickness of a cover glass. Such a technique may be very similar to that described above with regard to a fingerprint sensor "under" a cover glass, although there may be additional actions taken. For example, a hole or opening may be provided in the cover glass around the ultrasonic fingerprint sensor, and the fingerprint sensor, instead of being covered by the cover glass, may have a separate cover, e.g., a spacer glass, or coating, e.g., Parylene. Alternatively, the cover glass may simply not extend over the ultrasonic fingerprint sensor.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations can be selectively combined to provide one or more comprehensive, but slightly different, technical solutions. It will therefore be further appreciated that the above description has been given by way of example only and that modifications in detail may be made within the scope of this disclosure.

What is claimed is:
1. A display module comprising:
a thin-film transistor (TFT) backplane including:
   a substrate with a first side and an opposing second side,
   an array of display pixel circuits located on the first side, each display pixel circuit configured to cause a display pixel of a display device connectable to the TFT backplane to change light-emitting, light-transmitting, or light-reflecting states, and
   an array of sensor pixel circuits located on the first side, each sensor pixel circuit configured to form part of a piezoelectric ultrasonic fingerprint sensor circuit and configured to read a charge provided to the piezoelectric ultrasonic fingerprint sensor circuit from an array location in the array of sensor pixel circuits, wherein the array of display pixel circuits and the array of sensor pixel circuits occupy non-overlapping areas of the TFT backplane;
one or more display components positioned between the cover glass and the TFT backplane, the one or more display components configured to, in conjunction with the array of display pixel circuits, provide display functionality for the display module; and
a piezoelectric ultrasonic fingerprint sensor, wherein:
the display module has an active display area defined by the maximum extents of the array of display pixel circuits,
the piezoelectric ultrasonic fingerprint sensor is located outside of the active display area,
at least part of the piezoelectric ultrasonic fingerprint sensor is located between the TFT backplane and the cover glass,
the array of sensor pixel circuits forms part of the piezoelectric ultrasonic fingerprint sensor, and
the piezoelectric ultrasonic fingerprint sensor includes one or more layers of material such that a surface of the piezoelectric ultrasonic fingerprint sensor furthest from the TFT backplane is at the same distance from the TFT backplane as a surface of the one or more display components furthest from the TFT backplane.

2. The display module of claim 1, wherein the fingerprint sensor is sized to capture fingerprints from at least two fingers simultaneously.

3. The display module of claim 1, wherein the piezoelectric ultrasonic biometric sensor is a palmprint sensor.

4. The display module of claim 1, further comprising a single sensor pixel circuit separate from the array of sensor pixel circuits, the single pixel circuit configured to perform as an ultrasonic button.

5. The display module of claim 1, further comprising an array of pixel input electrodes, wherein:
each pixel input electrode overlays a sensor pixel circuit in the array of sensor pixel circuits,
the sensor pixel circuits are spaced apart at a first pitch distance in a first direction, and
each pixel input electrode has a nominal width in the first direction greater than about 70% of the first pitch distance and less than the first pitch distance.

6. The display module of claim 1, further comprising a piezoelectric layer that overlays the array of sensor pixel circuits.

7. The display module of claim 1, wherein the sensor pixel circuits are arrayed with a density of approximately 500 sensor pixel circuits per inch or higher.

8. The display module of claim 1, further comprising:
a plurality of display data traces that are substantially parallel to one another and spaced apart by a first pitch distance within the area of the TFT backplane occupied by the array of display pixel circuits; and
a display fanout, wherein:
the display data traces enter the display fanout spaced apart by the first pitch distance and exit the display fanout spaced apart by a second pitch distance less than the first pitch distance, and
the display fanout is located substantially between the array of sensor pixel circuits and the array of display pixel circuits.

9. The display module of claim 8, further comprising:
a plurality of sensor data traces that are substantially parallel to one another and spaced apart by a third pitch distance within the area of the TFT backplane occupied by the array of sensor pixel circuits; and
a sensor fanout, wherein the sensor data traces enter the sensor fanout spaced apart by the third pitch distance and exit the sensor fanout spaced apart by a fourth pitch distance less than the third pitch distance.

10. The display module of claim 9, further comprising:
a display driver chip located on the TFT backplane; and
a sensor driver chip located on the TFT backplane, wherein:
the display driver chip is electrically connected to the display data traces exiting the display fanout,
the sensor driver chip is electrically connected to the sensor data traces exiting the sensor fanout, and
the sensor driver chip and the display driver chip are separate chips.

11. The display module of claim 9, further comprising:
a combined display and sensor driver chip located on the TFT backplane, wherein:
the combined display and sensor driver chip is electrically connected to the display data traces exiting the display fanout and the sensor data traces exiting the sensor fanout, and
the combined display and sensor driver chip is a single, integrated chip.

12. A display module comprising:
a cover glass sized larger than an active display area of the display module;
a thin-film transistor (TFT) backplane with a first side and an opposing second side, wherein the TFT backplane has:
an array of display pixel circuits located on the first side, wherein the display module has an active display area defined by the maximum extents of the array of display pixel circuits, and
an array of sensor pixel circuits located on the first side, each sensor pixel circuit configured to form part of a piezoelectric ultrasonic fingerprint sensor circuit for a piezoelectric ultrasonic fingerprint sensor, wherein the array of sensor pixel circuits is located outside of the active display area;
one or more display components positioned between the cover glass and the TFT backplane, the one or more display components configured to, in conjunction with the array of display pixel circuits, provide display functionality for the display module;
the piezoelectric ultrasonic fingerprint sensor, wherein:
at least part of the piezoelectric ultrasonic fingerprint sensor is located between the TFT backplane and the cover glass, and
the array of sensor pixel circuits forms part of the piezoelectric ultrasonic fingerprint sensor; and
one or more layers of material interposed between the piezoelectric ultrasonic fingerprint sensor and the cover glass, wherein the one or more layers of material is free of gaps between the piezoelectric ultrasonic sensor and the cover glass.

13. The display module of claim 12, wherein:
the ultrasonic sensor system includes an ultrasonic transmitter and an ultrasonic receiver in a stacked arrangement, and
the distance between the ultrasonic transmitter and the cover glass and the distance between the ultrasonic receiver and the cover glass are both substantially free of gaps.

14. The display module of claim 13, wherein:
the ultrasonic transmitter includes a piezoelectric ultrasonic transmitter layer interposed between a first transmitter electrode and a second transmitter electrode, and the ultrasonic receiver includes a piezoelectric ultrasonic receiver layer interposed between the array of sensor pixel circuits and a receiver bias electrode.

15. The display module of claim 14, wherein the ultrasonic receiver is interposed between the TFT backplane and the cover glass.

16. The display module of claim 15, further comprising the one or more layers of material include one or more spacers arranged in a stacked configuration with the ultrasonic receiver, wherein:
- the one or more display components positioned between the cover glass and the TFT backplane has a display stack thickness that defines an offset between the cover glass and the TFT backplane,
- the ultrasonic receiver, inclusive of the receiver bias electrode, has an ultrasonic receiver thickness that is less than the display stack thickness, and
- the stacked configuration of the one or more spacers and the ultrasonic receiver, inclusive of the receiver bias electrode and any adhesive or bonding layers between the ultrasonic receiver and the one or more spacers, has a first stack thickness that is substantially equal to the display stack thickness.

17. The display module of claim 14, further comprising a conductive touch layer formed on the cover glass, wherein the receiver bias electrode is provided by a portion of the conductive touch layer.

18. The display module of claim 17, wherein the conductive touch layer around the array of sensor pixel circuits is electrically reinforced with an electrically-reinforcing material and the conductive touch layer within the array of sensor pixel circuits is substantially free of the electrically-reinforcing material.

19. The display module of claim 18, wherein the electrically-reinforcing material is silver ink.

20. A display module comprising:
- a thin-film transistor (TFT) backplane including:
  - a substrate with a first side and an opposing second side;
  - an array of display pixel circuits located on the first side, each display pixel circuit configured to cause a display pixel of a display device associated with the TFT backplane to change light-emitting, light-transmitting, or light-reflecting states, wherein the display module has an active display area defined by the maximum extents of the array of display pixel circuits; and
  - a piezoelectric ultrasonic sensor pixel circuit located on the first side, the sensor pixel circuit configured to form part of a piezoelectric ultrasonic sensor circuit configured to read a charge provided to the piezoelectric ultrasonic sensor circuit, wherein the sensor pixel circuit is located outside of the active display area;
- one or more display components positioned between the cover glass and the TFT backplane, the one or more display components configured to, in conjunction with the array of display pixel circuits, provide display functionality for the display module; and
- a piezoelectric ultrasonic sensor, wherein:
  - at least part of the piezoelectric ultrasonic sensor is located between the TFT backplane and the cover glass,
  - the piezoelectric ultrasonic sensor pixel circuit forms part of the piezoelectric ultrasonic sensor, and
  - the piezoelectric ultrasonic sensor includes one or more layers of material such that a surface of the piezoelectric ultrasonic sensor furthest from the TFT backplane is at the same distance from the TFT backplane as a surface of the one or more display components furthest from the TFT backplane.

21. The display module of claim 20, wherein the piezoelectric ultrasonic sensor is configured to be a button control.

22. The display module of claim 20, further comprising one or more additional piezoelectric ultrasonic sensor pixel circuits that form a further part of the piezoelectric ultrasonic sensor.

23. The display module of claim 22, wherein the piezoelectric ultrasonic sensor pixel circuit and the one or more additional piezoelectric ultrasonic sensor pixel circuits are configured to provide a slider control.

24. The display module of claim 20, further comprising:
- an array of second piezoelectric ultrasonic sensor pixel circuits located on the first side, each second piezoelectric ultrasonic sensor pixel circuit configured to form part of a second piezoelectric ultrasonic sensor circuit configured to read a charge provided to the second piezoelectric ultrasonic sensor circuit from an array location, wherein:
- the array of display pixel circuits and the array of second piezoelectric ultrasonic sensor pixel circuits occupy non-overlapping areas of the TFT backplane.

\* \* \* \* \*